US012812577B2

(12) United States Patent
Arslan

(10) Patent No.: US 12,812,577 B2
(45) **Date of Patent: *Nov. 24, 2026**

(54) BAUDRATE TRACKING USING PATTERN DETECTORS FOR SYNCHRONIZATION PATTERN DETECTION

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 505 days.

This patent is subject to a terminal disclaimer.

(21) Appl. No.: 18/383,704

(22) Filed: Oct. 25, 2023

(65) Prior Publication Data

US 2025/0106795 A1 Mar. 27, 2025

Related U.S. Application Data

(63) Continuation-in-part of application No. 18/373,621, filed on Sep. 27, 2023, now Pat. No. 12,700,986.

(51) Int. Cl.
*H04W 56/00* (2009.01)

(52) U.S. Cl.
CPC ..... *H04W 56/0035* (2013.01); *H04W 56/001* (2013.01)

(58) Field of Classification Search
CPC .. H04L 7/042; H04W 56/001; H04W 56/0035
(Continued)

(56) References Cited

U.S. PATENT DOCUMENTS

2020/0169349 A1* 5/2020 Kilian .................... H04B 17/10
2024/0121147 A1* 4/2024 Kleinerman ........ H04L 27/2663
(Continued)

FOREIGN PATENT DOCUMENTS

CN 120470411 A * 8/2025 ............. G06N 3/045
DE 102023122668 A9 * 3/2024 ........ H04W 56/0035

OTHER PUBLICATIONS

Office Action mailed Oct. 22, 2025 in co-pending U.S. Appl. No. 18/373,621.
(Continued)

*Primary Examiner* — Asad M Nawaz
(74) *Attorney, Agent, or Firm* — Nields, Lemack & Frame, LLC

(57) ABSTRACT

A synchronization pattern detector is disclosed. The synchronization pattern detector includes a plurality of pattern detectors, which may be correlators or cost function engines which each calculate a partial metric, which may be a correlation score or cost value of a subset of the incoming data bits, respectively. The pattern detectors are arranged in a two dimensional array where each row processes data samples associated with a particular phase of the incoming data bits. These partial metrics are summed together to calculate a total metric for a particular symbol stream. Summing circuits are configured to calculate metrics for various scenarios, such as transmit baudrate equal to, slower than, or faster than the receiver baudrate. In addition to detecting the synchronization pattern, the detector may also provide information that is used to adjust parameters of the read circuit to better align the receiver baudrate to the transmit baudrate.

19 Claims, 22 Drawing Sheets

(58) Field of Classification Search
USPC .......................................................... 370/350
See application file for complete search history.

(56) References Cited

U.S. PATENT DOCUMENTS

2024/0420735 A1* 12/2024 Galbraith ......... G11B 20/10037
2025/0106000 A1* 3/2025 Arslan .................... H04L 7/041

OTHER PUBLICATIONS

Notice of Allowance mailed Apr. 24, 2026 in co-pending U.S. Appl. No. 18/373,621.

* cited by examiner

BAUDRATE TRACKING USING PATTERN DETECTORS FOR SYNCHRONIZATION PATTERN DETECTION

This application is a continuation-in-part of U.S. patent application Ser. No. 18/373,621, filed Sep. 27, 2023, the disclosure of which is incorporated herein by reference in its entirety.

FIELD

This disclosure describes systems and methods for implementing a correlator or cost function engine that may be used for pattern detection which can accommodate large baudrate offsets.

BACKGROUND

Data communications require the formatting, encoding and modulation of data from a transmitting device to a receiving device. In many communication systems, the communication channel, which may be a cable, wire or another medium, such as air, introduces errors, due to noise, bandwidth limitations or other factors.

Many protocols utilize a synchronization pattern, sometimes referred to as a sync pattern, to enable the receiver to properly align the incoming bits into bytes and words. In some embodiments, a pattern detector is used to identify the sync pattern, where each bit of the sync pattern is compared to the expected value using a binary comparison. In some scenarios, the pattern detector may tolerate one or more errors and still detect the sync pattern.

Another approach is the use of a cost function. A cost function uses the incoming differentiated phase information and compares that to the expected differentiated phase values by calculating a difference between the two values. The absolute values of each difference are summed to create a cost value. This sequence is repeated as each bit is received, until a cost value below a predetermined threshold is detected. Once this occurs, it is assumed that the synchronization pattern has been received.

Another approach is the use of correlators. A correlator uses the incoming differentiated phase information and multiplies that by a value, which is typically indicative of the expected polarity of the incoming value. These products are summed to create a total correlation score. This sequence is repeated as each bit is received, until the total correlation score is greater than a predetermined threshold is detected. Once this occurs, it is assumed that the synchronization pattern has been received.

Thus, either correlators or cost function engines may serve as pattern detectors. In certain embodiments, oversampling is performed where multiple phase values are collected during each bit time. In this embodiment, there may be multiple pattern detectors, where each is associated with a particular oversampled sequence. For example, if the input is oversampled by a factor of 4, there may be four pattern detectors, where the first uses samples 0, 4, 8, 12 . . . ; the second uses samples 1, 5, 9, 13 . . . ; and so on.

While the cost function engine is very proficient at detecting synchronization patterns, its performance decreases if there is a frequency offset between the clock used to transmit the incoming data and the clock used to sample that incoming data. As the frequency offset increases, this degradation in performance may also increase. Frequency difference in the clock between the transmitter and the receiver causes frequency offset between the local oscillator of the transmitter and the receiver and also causes baud rate offset between the transmitter and the receiver.

Therefore, it would be beneficial if there were a system and method that utilizes a synchronization pattern detector that is tolerant of baud rate offsets between the transmitting node and the receiving node.

SUMMARY

A synchronization pattern detector is disclosed. The synchronization pattern detector includes a plurality of pattern detectors, which may be correlators or cost function engines which each calculate a partial metric which may be a correlation score or a cost value of a subset of the incoming data bits, respectively. The pattern detectors are arranged in a two dimensional array where each row processes data samples associated with a particular phase of the incoming data bits. These partial metrics are summed together to calculate a total metric for a particular symbol stream. Summing circuits are configured to calculate metrics for various scenarios, such as transmit baudrate equal to, slower than or faster than the receiver baudrate. In addition to detecting the synchronization pattern, the detector may also provide information that is used to adjust parameters of the read circuit to better align the receiver baudrate to the transmit baudrate.

According to one embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR) and wherein data samples that are separated by (OSR−1) samples are referred to as a phase of the data bits and wherein there are OSR phases of the data bits; a synchronization pattern detector to detect a synchronization pattern from a plurality of received data samples, wherein the synchronization pattern detector comprises: a plurality of cost function engines arranged in an array of rows and columns, wherein the rows of the array are associated with a particular phase of the data bits and columns of the array are associated with time; wherein each cost function engine processes a predetermined number of data samples which all belong to one phase and produces a partial cost value; a shift register associated with each cost function engine to store at least three values, wherein one value is referred to as a current partial cost value, values that are stored prior to the current partial cost value are referred to as previous partial cost values, and values that are stored after the current partial cost value are referred to as future partial cost values, wherein there is at least one previous partial cost value, one current partial cost value and at least one future partial cost value; a plurality of summing circuits, each having an input from a shift register associated with a cost function engine in each column so as to create a total cost associated with a symbol stream; and a comparator to compare an output from each summing circuit to a predetermined threshold to determine whether the synchronization pattern has been detected. In some embodiments, each cost function engine processes 8 data samples to generate the partial cost value. In certain embodiments, the shift register contains one previous partial cost value, one current partial cost value and one future partial cost value. In some embodiments, each cost function engine processes 4 data samples to generate the partial cost value. In certain embodiments, the shift register contains two previous partial cost values, one current partial cost value and two future partial cost values. In some embodiments, the symbol stream used by at least one of the summing circuits utilizes partial cost values generated by cost functions using different phases. In some embodiments, inputs to at least one summing circuit are selected such that at least one gap larger than (OSR−1) samples or smaller than (OSR−1) samples exists in the symbol stream. In certain embodiments, if the total cost associated with the at least one summing circuit that utilizes a symbol stream having at least one gap larger than (OSR−1) samples is lowest, the incoming data is transmitted at a transmit baudrate having a lower frequency than a receiver baudrate used by the wireless network device. In certain embodiments, a number of gaps larger than (OSR−1) samples in the symbol stream that resulted in a lowest cost is indicative of a magnitude of a difference between the transmit baudrate and the receiver baudrate used by the wireless network device. In some embodiments, if the total cost associated with the at least one summing circuit that utilizes a symbol stream having at least one gap smaller than (OSR−1) samples is lowest, the incoming data is transmitted at a transmit baudrate having a higher frequency than a receiver baudrate used by the wireless network device. In certain embodiments, a number of gaps smaller than (OSR−1) samples in the symbol stream that resulted in a lowest cost is indicative of a magnitude of a difference between the transmit baudrate and the receiver baudrate used by the wireless network device. In some embodiments, the read circuit comprises an analog to digital converter to generate data samples, and a sample rate converter to generate I and Q signals at an oversample rate, and a sample memory to store entries used by the synchronization pattern detector and a decision device, wherein parameters associated with the read circuit are modified based on a number of gaps different from (OSR−1) that are present in the symbol stream that resulted in a lowest cost. In certain embodiments, the network device modifies the parameters of the read circuit to eliminate a difference between a receiver baudrate of the wireless network device and the transmit baudrate. In certain embodiments, the network device modifies the parameters of the read circuit to iteratively reduce a difference between a receiver baudrate of the wireless network device and the transmit baudrate. In some embodiments, the network device stores an indication of a difference between a receiver baudrate of the wireless network device and the transmit baudrate for a transmitting node based on a number of gaps different from (OSR−1) that are present in the symbol stream that resulted in a lowest cost, and uses the indication to modify the parameters of the read circuit when a subsequent packet is received from the transmitting node.

According to a second embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR), the RF circuit comprising an analog to digital converter (ADC) to generate data samples from the incoming data, a sample rate converter to generate I and Q signals at a desired rate, and a sample memory to store a plurality of entries; a synchronization pattern detector to detect a synchronization pattern using the plurality of entries in the sample memory, wherein the synchronization pattern detector computes a cost for each of a plurality of symbol streams, each of the plurality of symbol streams comprising a number of samples equal to a number of bits in the synchronization pattern, wherein in a first set of symbol streams, a gap of (OSR−1) samples exists between each pair of successive samples, wherein in a second set of symbol streams, a gap greater than (OSR−1) samples exists between at least one pair of successive samples, and wherein in a third set of symbol streams, a gap less than (OSR−1) samples exists between at least one pair of successive samples, and wherein the cost of each of the plurality of symbol streams is compared to a predetermined threshold, and wherein the synchronization pattern is detected if the cost of one of the plurality of symbol streams is less than the predetermined threshold. In some embodiments, a frequency of a sample clock used by the ADC to generate the plurality of data samples is modified based on which of the plurality of symbol streams resulted in detection of the synchronization pattern. In some embodiments, a rate at which the I and Q signals are generated by the sample rate converter is adjusted based on which of the plurality of symbol streams resulted in detection of the synchronization pattern. In some embodiments, the read circuit comprises a decision device to further process the data samples, wherein entries from the sample memory that are provided to the decision device are selected based on which of the plurality of symbol streams resulted in detection of the synchronization pattern.

According to a third embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR) and wherein data samples that are separated by (OSR−1) samples are referred to as a phase of the data bits and wherein there are OSR phases of the data bits; a synchronization pattern detector to detect a synchronization pattern from a plurality of received data samples, wherein the synchronization pattern detector comprises: a plurality of correlators arranged in an array of rows and columns, wherein the rows of the array are associated with a particular phase of the data bits and columns of the array are associated with time; wherein each correlator processes a predetermined number of data samples which all belong to one phase and produces a partial correlation score; a shift register associated with each correlator to store at least three values, wherein one value is referred to as a current partial correlation score, values that are stored prior to the current partial correlation score are referred to as previous partial correlation score, and values that are stored after the current partial correlation score are referred to as future partial correlation score, wherein there is at least one previous partial correlation score, one current partial correlation score and at least one future partial correlation score; a plurality of summing circuits, each having an input from a shift register associated with a correlator in each column so as to create a total correlation score associated with a symbol stream; and a comparator to compare an output from each summing circuit to a predetermined threshold to determine whether the synchronization pattern has been detected. In some embodiments, each correlator processes 8 data samples to generate the partial correlation score. In certain embodiments, the shift register contains one previous partial correlation score, one current partial correlation score and one future partial correlation score. In some embodiments, each correlator processes 4 data samples to generate the partial correlation score. In certain embodiments, the shift register contains two previous partial correlation scores, one current partial correlation score and two future partial correlation scores. In some embodiments, the symbol stream used by at least one of the summing circuits utilizes partial correlation scores generated by correlators using different phases. In some embodiments, inputs to at least one summing circuit are selected such that at least one gap larger than (OSR−1) samples or smaller than (OSR−1) samples exists in the symbol stream. In certain embodiments, if the total correlation score associated with the at least one summing circuit that utilizes a symbol stream having at least one gap larger than (OSR−1) samples is greatest, the incoming data is transmitted at a transmit baudrate having a lower frequency than a receiver baudrate used by the wireless network device. In certain embodiments, a number of gaps larger than (OSR−1) samples in the symbol stream that resulted in a greatest correlation score is indicative of a magnitude of a difference between the transmit baudrate and the receiver baudrate used by the wireless network device. In some embodiments, if the total correlation score associated with the at least one summing circuit that utilizes a symbol stream having at least one gap smaller than (OSR−1) samples is greatest, the incoming data is transmitted at a transmit baudrate having a higher frequency than a receiver baudrate used by the wireless network device. In certain embodiments, a number of gaps smaller than (OSR−1) samples in the symbol stream that resulted in a greatest correlation score is indicative of a magnitude of a difference between the transmit baudrate and the receiver baudrate used by the wireless network device. In some embodiments, the read circuit comprises an analog to digital converter to generate data samples, and a sample rate converter to generate I and Q signals at an oversample rate, and a sample memory to store entries used by the synchronization pattern detector and a decision device, wherein parameters associated with the read circuit are modified based on a number of gaps different from (OSR−1) that are present in the symbol stream that resulted in a greatest correlation score. In certain embodiments, the network device modifies the parameters of the read circuit to eliminate a difference between a receiver baudrate of the wireless network device and the transmit baudrate. In certain embodiments, the network device modifies the parameters of the read circuit to iteratively reduce a difference between a receiver baudrate of the wireless network device and the transmit baudrate. In some embodiments, the network device stores an indication of a difference between a receiver baudrate of the wireless network device and the transmit baudrate for a transmitting node based on a number of gaps different from (OSR−1) that are present in the symbol stream that resulted in a greatest correlation score, and uses the indication to modify the parameters of the read circuit when a subsequent packet is received from the transmitting node.

According to a fourth embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR), the RF circuit comprising an analog to digital converter (ADC) to generate data samples from the incoming data, a sample rate converter to generate I and Q signals at a desired rate, and a sample memory to store a plurality of entries; a synchronization pattern detector to detect a synchronization pattern using the plurality of entries in the sample memory, wherein the synchronization pattern detector computes a correlation score for each of a plurality of symbol streams, each of the plurality of symbol streams comprising a number of samples equal to a number of bits in the synchronization pattern, wherein in a first set of symbol streams, a gap of (OSR−1) samples exists between each pair of successive samples, wherein in a second set of symbol streams, a gap greater than (OSR−1) samples exists between at least one pair of successive samples, and wherein in a third set of symbol streams, a gap less than (OSR−1) samples exists between at least one pair of successive samples, and wherein the correlation score of each of the plurality of symbol streams is compared to a predetermined threshold, and wherein the synchronization pattern is detected if the correlation score of one of the plurality of symbol streams is greater than the predetermined threshold. In some embodiments, a frequency of a sample clock used by the ADC to generate the plurality of data samples is modified based on which of the plurality of symbol streams resulted in detection of the synchronization pattern. In some embodiments, a rate at which the I and Q signals are generated by the sample rate converter is adjusted based on which of the plurality of symbol streams resulted in detection of the synchronization pattern. In some embodiments, the read circuit comprises a decision device to further process the data samples, wherein entries from the sample memory that are provided to the decision device are selected based on which of the plurality of symbol streams resulted in detection of the synchronization pattern.

According to a fifth embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR) and wherein data samples that are separated by (OSR−1) samples are referred to as a phase of the data bits and wherein there are OSR phases of the data bits; a synchronization pattern detector to detect a synchronization pattern from a plurality of received data samples, wherein the synchronization pattern detector comprises: a plurality of pattern detectors arranged in an array of rows and columns, wherein the rows of the array are associated with a particular phase of the data bits and columns of the array are associated with time; wherein each pattern detector processes a predetermined number of data samples which all belong to one phase and produces a partial metric; a shift register associated with each pattern detector to store at least three values, wherein one value is referred to as a current partial metric, values that are stored prior to the current partial metric are referred to as previous partial metric, and values that are stored after the current partial metric are referred to as future partial metrics, wherein there is at least one previous partial metric, one current partial metric and at least one future partial metric; a plurality of summing circuits, each having an input from a shift register associated with a pattern detector in each column so as to create a metric associated with a symbol stream; and a comparator to compare an output from each summing circuit to a predetermined threshold to determine whether the synchronization pattern has been detected. In some embodiments, the pattern detector comprises a cost function engine, and the metric is cost. In other embodiments, the pattern detector comprises a correlator, and the metric is correlation score.

According to a sixth embodiment, a wireless network device is disclosed. The wireless network device comprises a processing unit; and a read circuit, wherein the read circuit comprises: an RF circuit to receive incoming data and create a plurality of data samples per data bit, each having a certain phase, wherein a number of data samples created per data bit is referred to as an oversample rate (OSR), the RF circuit comprising an analog to digital converter (ADC) to generate data samples from the incoming data, a sample rate converter to generate I and Q signals at a desired rate, and a sample memory to store a plurality of entries; a synchronization pattern detector to detect a synchronization pattern using the plurality of entries in the sample memory, wherein the synchronization pattern detector computes a metric for each of a plurality of symbol streams, each of the plurality of symbol streams comprising a number of samples equal to a number of bits in the synchronization pattern, wherein in a first set of symbol streams, a gap of (OSR−1) samples exists between each pair of successive samples, wherein in a second set of symbol streams, a gap greater than (OSR−1) samples exists between at least one pair of successive samples, and wherein in a third set of symbol streams, a gap less than (OSR−1) samples exists between at least one pair of successive samples, and wherein the metric of each of the plurality of symbol streams is compared to a predetermined threshold to detect the synchronization pattern. In some embodiments, the synchronization pattern detector comprises a plurality of correlators, the metric is correlation score, and the synchronization pattern is detected if the correlation score exceeds the predetermined threshold. In other embodiments, the synchronization pattern detector comprises a plurality of cost function engines, the metric is cost, and the synchronization pattern is detected if the cost is less than the predetermined threshold.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, the baudrate offset between the transmitting device and the receiving device may degrade the performance of a synchronization pattern detector. Throughout this disclosure the term “transmit baudrate” denotes the rate at which the transmit device transmits data bits. Further, the term “receiver baudrate” denotes the rate at which the receiving device receives the data bits. Note that the receiver typically generates multiple samples per data bit. This is referred to as oversampling and a oversample rate of OSR yields OSR samples per data bit. Thus, the sample rate of the receiver is defined as the receiver baudrate multiplied by OSR. Conversely, the receiver baudrate is defined as the sample rate divided by OSR.

Figure 1:
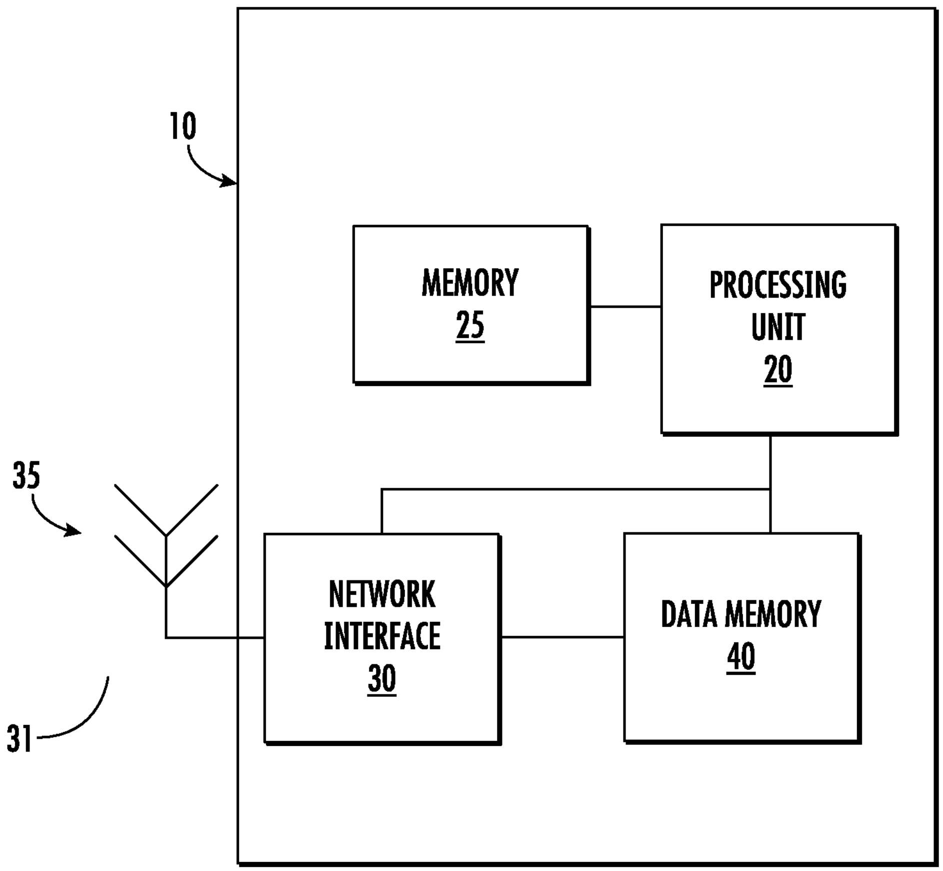
FIG. 1 is a block diagram of a representative network device that may utilize the improved synchronization pattern detector according to one embodiment.

FIG. 1 shows a block diagram of a representative network device 10 that utilizes an improved synchronization pattern detector according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the wireless network 31. Although not shown, the network device 10 also has a power supply, which may be a battery or a connection to a permanent power source, such as a wall outlet.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the network device 10, not its physical configuration.

Figure 2A:
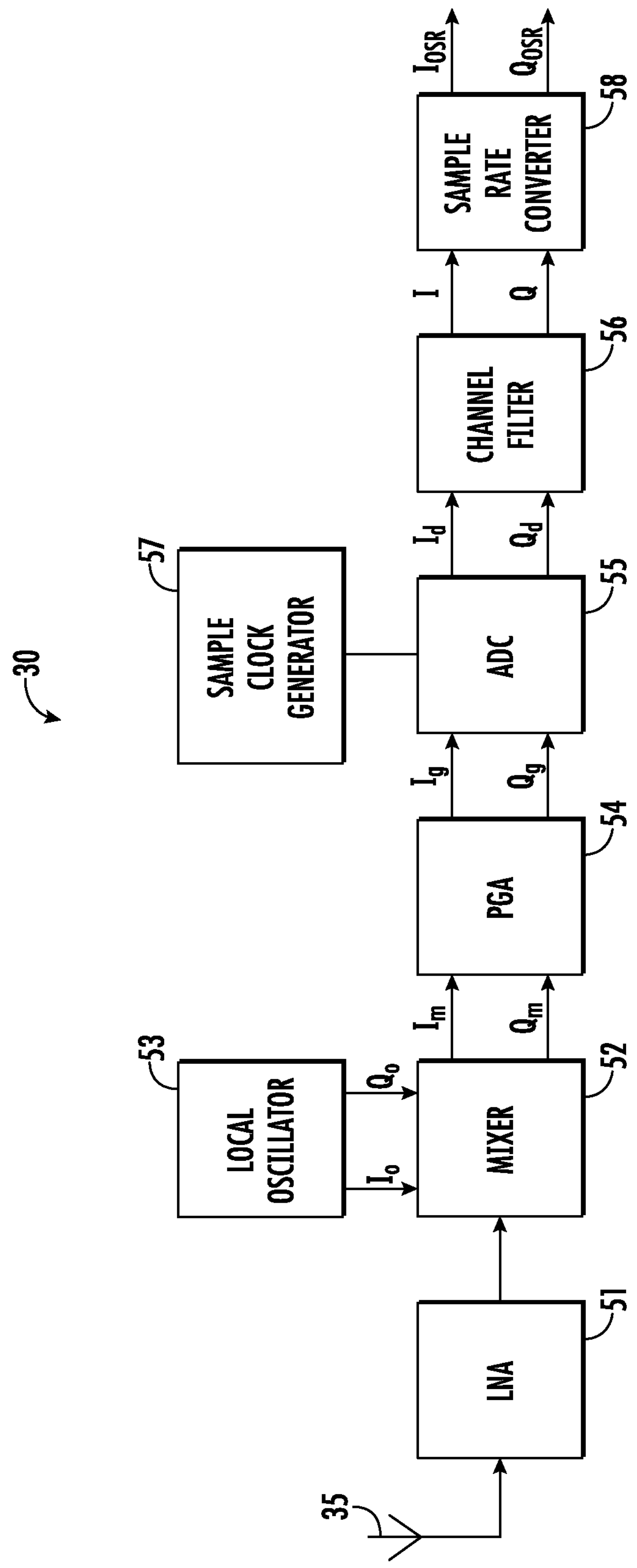
FIG. 2A is a detailed block diagram of a first part of the network interface of the network device of FIG. 1.
Figure 2B:
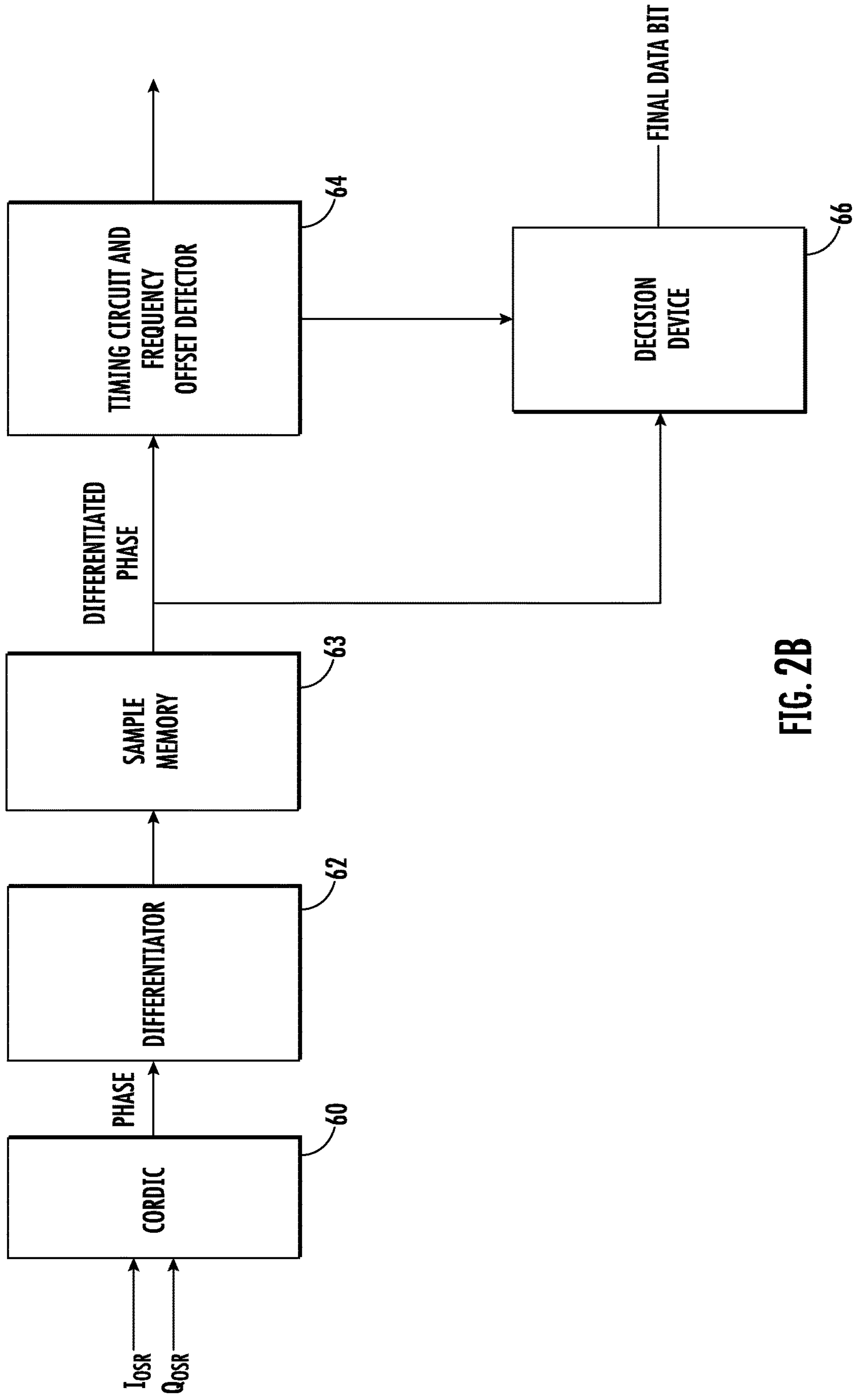
FIG. 2B is a detailed block diagram of a second part of the network interface of the network device of FIG. 1.

FIG. 2A-2B provide a more detailed illustration of the network interface 30. As shown in FIG. 2A, the wireless signals first enter the network interface 30 through the antenna 35. The antenna 35 is in electrical communication with a low noise amplifier (LNA) 51. The LNA 51 receives a very weak signal from the antenna 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. A sample clock generator 57 is used to supply the clock signal to the ADC 55 that triggers these conversions. The frequency of the output of the sample clock generator 57 may be generated based on the local oscillator 53. In other embodiments, it may be generated using a phase locked loop and an external crystal. These digital signals may then pass through a channel filter 56. The filtered signals are referred to as I and Q. The output of the channel filter 56 may be referred to as the baseband signals. The components that are used to receive the signal from the antenna 35 and produce the baseband signals are referred to as the RF circuit. Note that the rate at which the I and Q signals are generated may be linked to the sample clock used by the ADC 55. However, the sample clock used by the ADC 55 may not be equal to the baud rate of the incoming data. Therefore, in certain embodiments, a sample rate converter (SRC) 58 is used to create I and Q samples that are aligned to the expected baud rate of the incoming data. In other words, the sample rate converter 58 accepts the I and Q signals from the channel filter 56 as inputs, which have a first sample rate. The SRC 58 then creates new I and Q signals that have a second sample rate. Thus, the function of the SRC 58 is to ensure that there is an integer number of samples per symbol for the components that are downstream from the SRC 58. Since the sample rate for the ADC 55 is not determined by the baud rate, there is not necessarily an integer number of samples per symbol at the channel filter output. The SRC 58 is programmed so that this is corrected. The output of the SRC 58 is referred to as the $I_{OSR}$ and $Q_{OSR}$, since these are I and Q signals that are sampled at the oversample rate (OSR).

These $I_{OSR}$ and $Q_{OSR}$ signals can be used to recreate the amplitude and phase of the original signal. In certain embodiments, the $I_{OSR}$ and $Q_{OSR}$ values may be considered complex numbers, wherein the $I_{OSR}$ value is the real component and the $Q_{OSR}$ value is the imaginary component.

As shown in FIG. 2B, the $I_{OSR}$ and $Q_{OSR}$ signals then enter a CORDIC (Coordination Rotation Digital Computer) 60, which determines the amplitude and phase of the signals. Amplitude is given as the square root of $I_{OSR2}$ and $Q_{OSR2}$, while phase is given by the $\tan^{-1}$ ($Q_{OSR}/I_{OSR}$). In some embodiments, the CORDIC 60 may be a hardware component disposed in the network interface 30. In other embodiments, the CORDIC may be implemented in software.

The phase output from the CORDIC 60 is then supplied as an input to the differentiator 62. As is well known, the derivative of phase is frequency. Thus, by subtracting the values of two adjacent phase values, and optionally dividing the difference by a time duration, a value that is indicative of frequency can be determined. In some embodiments, the differentiator 62 may be a hardware component disposed in the network interface 30. In other embodiments, the differentiator may be implemented in software. The differentiated phase value may be a signed value, such as an 8-, 16- or 32-bit signed value.

These differentiated phase values may be stored in a sample memory 63. The sample memory 63 may act as a FIFO or ring buffer, where the most recent N values are stored, while older values are overwritten. In this way, the sample memory 63 holds the N most recent differentiated phase values. The value of N may be any suitable quantity. The output from the sample memory 63 is used as an input to a Timing Circuit and Frequency Offset Detector 64 and other components, such as the Decision Device 66. Note that while FIG. 2B shows the sample memory 63 disposed immediately after the differentiator 62, it may be implemented in other locations. For example, the sample memory may be disposed before the differentiator 62 or before the CORDIC 60. Further, in some embodiments, the sample memory 63 is different from the memory device 25 and data memory device 40 shown in FIG. 1. In other embodiments, a portion of the data memory device 40 is used to hold these values. Thus, the specific implementation of the sample memory 63 is not limited by this disclosure.

The Timing Circuit and Frequency Offset Detector 64 is used to detect when the synchronization pattern has been detected. This circuit may also be used to determine any frequency offset between the clock used by the transmitter and the clock used by this network device 10.

The differentiated phase signal from the sample memory 63 is also used as an input to a Decision Device 66. The Decision Device 66 receives inputs from the sample memory 63 and generates the actual data bits that will be used by the downstream components. In some embodiments, the Decision Device 66 is an equalizer. In some specific embodiments, the equalizer may be a Viterbi Equalizer. A Viterbi Equalizer is used to determine the value of each data bit, based on the values of the adjacent data bits. The output from the Viterbi Equalizer is the value of the data bit (i.e., 0 or 1). In other embodiments, the Decision Device 66 may be a slicer, that simply converts samples to bits without using any information about adjacent bits. In yet another embodiment, the Decision Device 66 may be a detector that utilizes machine learning to determine the actual data bits. The input to the Decision Device 66 is shown to be a differentiated phase signal; however, in other embodiments, it may be the phase signal. Further, the input is a multi-bit digital value, which is referred to as a data sample.

As described above, the SRC 58 ensures that there are an integral number of samples per data bit. The number of samples per data bit is referred to as the oversample rate. In certain embodiments, the SRC 58 samples the signal up by a factor of N and then decimates it by a factor of M to achieve the desired sample rate. As noted above, as there are OSR samples per bit time, the sample rate divided by the OSR is equal to the receiver baudrate.

Having described many of the components in the network interface 30, the Timing Circuit and Frequency Offset Detector 64 will be described in more detail. Note that the data samples that are provided to the Timing Circuit and Frequency Offset Detector 64 are also referred to as symbols. Further, as noted above, the incoming data is oversampled by a factor of OSR, creating OSR oversampled symbol streams, which each stream includes all symbols clocked with a certain phase. These phases are typically referred to as index values.

The Timing Circuit and Frequency Offset Detector 64 may have two functions. First, it may determine the frequency offset (if any) between the incoming symbol stream and the local oscillator 53 used by the network device 10. Second, it detects the synchronization pattern so that the packet may be properly recognized and processed.

One approach to calculating frequency offset is to sum the values of the data samples for a set of incoming bits and compare it to the expected sum of these data samples. A bit having a value of 1 is typically transmitted at a first frequency, such as $F_c+F_d$, where $F_e$ is the carrier frequency and $F_d$ is the modulation frequency. A bit having the value of 0 is typically transmitted at a second frequency, such as $F_c$-$F_d$. Further, the carrier frequency is typically removed before the data bits are processed. Therefore, any incoming data should appear as a sequence of data samples having values of $F_d$ and $-F_d$. If the expected sequence of bits is known, then the expected sum of those data bits is also known. For example, if the synchronization pattern contains 14 1's and 18 0's, the sum of these 32 bits should ideally be $-4F_d$. This expected sum is then compared to the actual sum. If there is no frequency offset, this expected sum will match the actual sum of those data bits. However, if there is a frequency offset between the transmitting device and this network device, each of these values will be changed. In other words, the sequence of data bits will have values of $F_o+F_d$ and $F_o-F_d$. Summing all of the bits in the sequence will result in a value that differs from the expected sum by $32F_o$ (assuming that the sync pattern is 32 bits in length). This difference is then averaged across the 32 bits, resulting in a value of $F_o$, which can then be subtracted from all of the incoming data bits to remove the frequency offset.

This frequency offset may then be removed from the data samples before further processing.

The other function of the Timing Circuit and Frequency Offset Detector 64 is to identify the synchronization pattern. This can be done by creating a cost function where an oversampled symbol stream is compared to the known synchronization pattern. The point at which this cost function is minimized is identified as the synchronization pattern.

Figure 3:
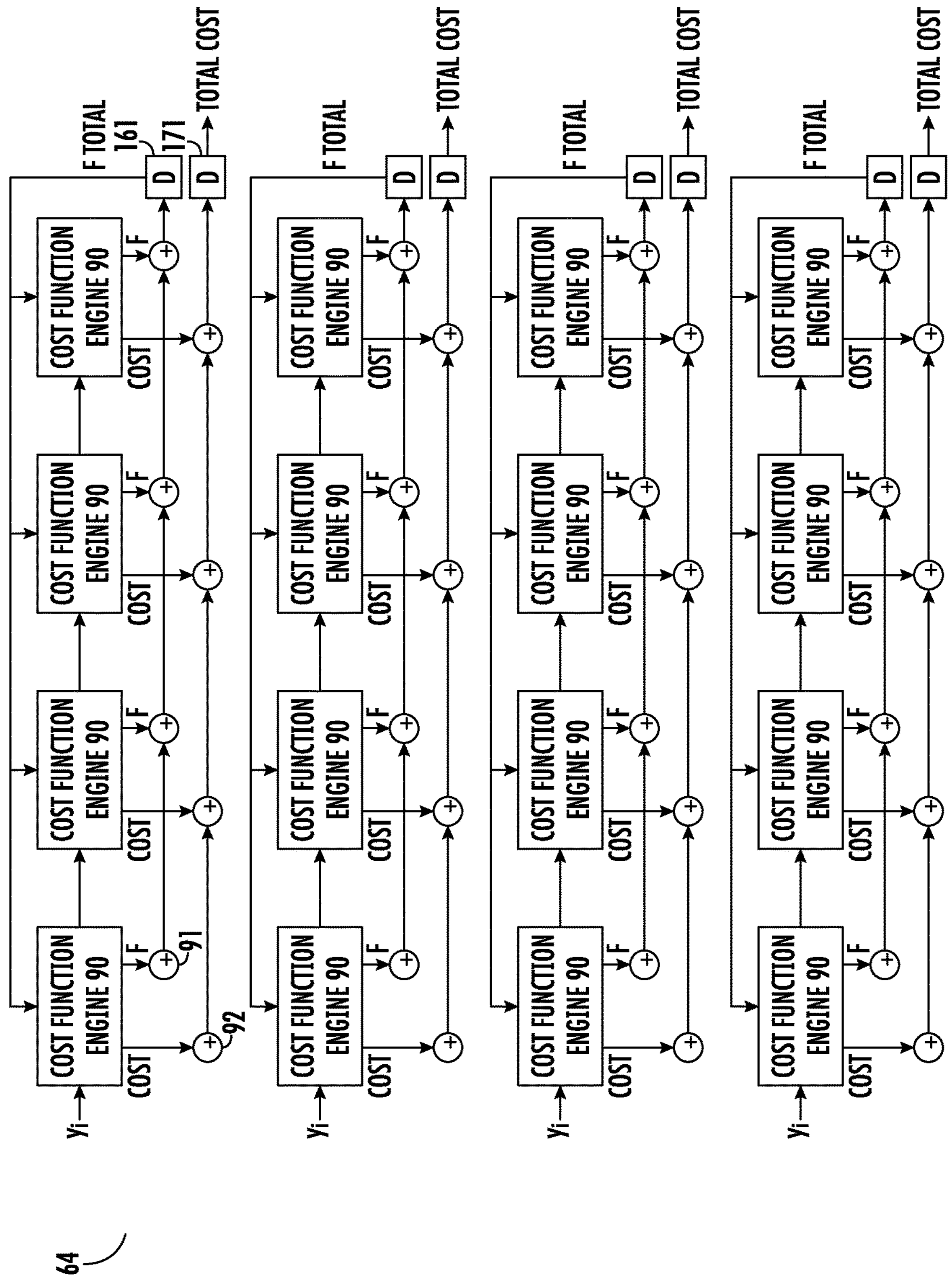
FIG. 3 shows the Timing Recovery and Synchronization circuit according to one embodiment.

FIG. 3 shows the Timing Circuit and Frequency Offset Detector 64 according to one embodiment. The Timing Circuit and Frequency Offset Detector 64 may include a plurality of cost function engines 90. These cost function engines are arranged in a plurality of rows and columns. The rows represent the cost function engines 90 that are associated with a particular phase of the incoming data. Thus, the output from one cost function engine 90 in a row serves as the input to the adjacent cost function engine 90 in that row. In other words, the cost function engines in each row function as a shift register. The columns represent the temporal order of the cost function engines 90. In other words, the column on the left receives the incoming data and therefore contains the most recent data, while the rightmost column contains the oldest samples. The number of rows is the same as the oversample rate. As noted above, the network device 10 may oversample the incoming data, such that there are multiple samples taken each bit time. All of the samples associated with a particular sampling phase (i.e. 0, 4, 8, 12, . . . ; 1, 5, 9, 13, . . . ; etc.) may be referred to as an oversampled symbol stream. As there are OSR samples per bit time, there are also OSR oversampled symbol streams. Thus, if the oversample rate is 4, then there are four rows; one associated with each sampling phase of the incoming data bits. The number of columns is dependent on the size of each cost function engine 90 and the number of symbols in the synchronization pattern. For example, if the synchronization pattern is 32 bits, and each cost engine function processes 8 samples at a time, there are 32/8 or 4 columns. Alternatively, if the cost function engines 90 process 4 samples, then there are 32/4 or 8 columns.

Each cost function engine 90 has two inputs. The first is the incoming oversampled symbol stream. As noted above, the cost function engines are arranged serially, such that the symbol output from one cost function engine 90 serves as the input to the adjacent cost function engine. The cost function engines 90 may also include a total frequency offset signal, as described in more detail below.

Each cost function engine 90 may have two outputs, a partial frequency offset output (F) and a partial cost output (Cost). In one embodiment, the partial frequency offset outputs from all of the cost function engines 90 in a given row may be summed using summing circuits 91 to generate a total frequency offset signal (F total). This F total signal may be stored in a total frequency offset storage element 161, and is then used as an input to each of the cost function engines 90 in that row, as explained in more detail below. In other embodiments, the partial cost outputs from different cost function engines 90 (one from each column) may be added to generate the total frequency offset. The partial cost output from each cost function engine 90 may also be summed using summing circuits 92 to generate a total cost, as explained in more detail below. This total cost may be stored in a total cost storage element 171.

Figure 4:
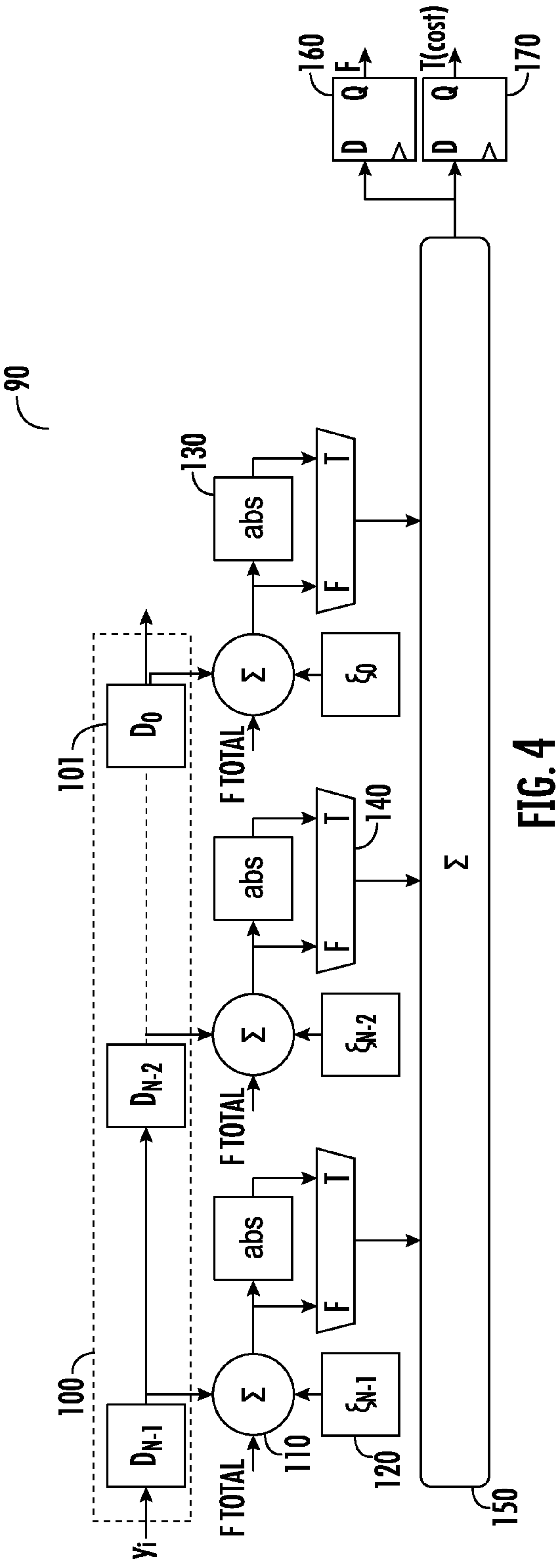
FIG. 4 shows a cost function engine according to one embodiment.

FIG. 4 shows one embodiment of a cost function engine 90. In this embodiment, the incoming data samples enter a shift register 100, which is made up of a plurality of storage devices 101, such as flip-flops or memory locations. As each new data sample enters the shift register 100, the data sample in each storage device 101 is moved to the adjacent storage device, such that the shift register 100 contains the most recently received N data samples, where N is the length of the shift register. In some embodiments, the synchronization pattern may be 32 bits. In these embodiments, N may be a number which is a factor of 32, such as 8 or 4.

The output of each storage device 101 is also used as an input to an adder 110. The other inputs to each adder 110 are the total frequency offset signal, which is shown in FIG. 3 and will be described later, and the expected signal level 120 for that particular bit, which depends on the synchronization pattern being detected. The expected signal level 120 may be stored in a storage element, such as a set of flip-flops or a memory location.

The output of each adder 110 is used as a first input to a corresponding multiplexer 140 and as an input to an absolute value circuit 130. The absolute value circuit 130 is used to convert any negative values into positive values. The output of the absolute value circuit 130 is used as a second input to the corresponding multiplexer 140.

The output of each of the multiplexers 140 are then provided to a summing circuit 150. In some embodiments, the output of the summing circuit 150 is then used to hold the partial frequency offset using partial frequency offset storage element 160, and is also used to hold the partial cost value using partial cost storage element 170.

Having defined the circuitry in the Timing Circuit and Frequency Offset Detector 64, its operation will now be described.

First, the expected signal level 120 for each data sample is set to the bits corresponding to the synchronization pattern. Further, the value of F total, which is an input to the adders 110 is initially set to 0.

When N data samples is present in the shift register 100, the output of each of the adders 110 at this time may be given by: $y_i \pm \xi_c$, wherein the sign of c is determined based on the bit position. The outputs from the adders 110 are passed through the multiplexers 140 and appear at the summing circuit 150, which then totals all of these values. The output of the summing circuit 150 is then saved in partial frequency offset storage element 160. In certain embodiments, the least significant $\log_2 N$ bits of the output are ignored, which converts the sum into an average, and the remaining bits are stored as the partial frequency offset, F. These partial frequency offsets, F, are summed using summing circuit 91 (see FIG. 3) to generate the total frequency offset (F total). Thus, at this point, the Timing Circuit and Frequency Offset Detector 64 produces a F total signal for each oversampled symbol stream, which is defined as:

$$\frac{1}{32}\sum_{i=0}^{31}(y_i - \xi_i),$$

wherein ξi is either a positive value or a negative value.

Having determined the frequency offset, the Timing Circuit and Frequency Offset Detector 64 is then reconfigured to find the synchronization pattern. First, F total, which is an input to all of the adders 110 is now defined as the F total value that was calculated above. The multiplexers 140 are also reconfigured so that the output from the absolute value circuit 130 is used.

By configuring the Timing Circuit and Frequency Offset Detector 64 in this manner, the output from the summing circuit 150, which is the partial cost, is defined as:

$$C = \sum_{i=0}^{N-1} |y_i - F_{total} - \xi_i|$$

The partial costs are then summed using summing circuit 92 (see FIG. 3) to generate the total cost. When this value is at a minimum, the synchronization pattern is detected. Note that while this embodiment subtracts the frequency offset (F total), in other embodiments, the cost function engines may simply calculate:

$$C = \sum_{i=0}^{N-1} |y_i - \xi_i|$$

While FIG. 4 shows the frequency offset function and the synchronization pattern detection being performed by a single circuit, it is understood that these functions can be separated into different circuits, each with its own shift register. For example, the frequency offset calculator may include a shift register, a set of adders and a summing circuit. The synchronization pattern detector may include a shift register, a set of adders, a set of absolute value circuits and a summing circuit.

As noted above, the circuit shown in FIG. 4, which is the cost function engine 90, is replicated a plurality of times, depending on the amount of oversampling that is performed, and the number of symbols processed by each cost function engine 90. If each cost function engine 90 processes 8 symbols and the oversampling rate (OSR) is 4, there are 16 copies of the circuit, arranged as 32/8 columns and OSR rows, as shown in FIG. 3.

Figure 5:
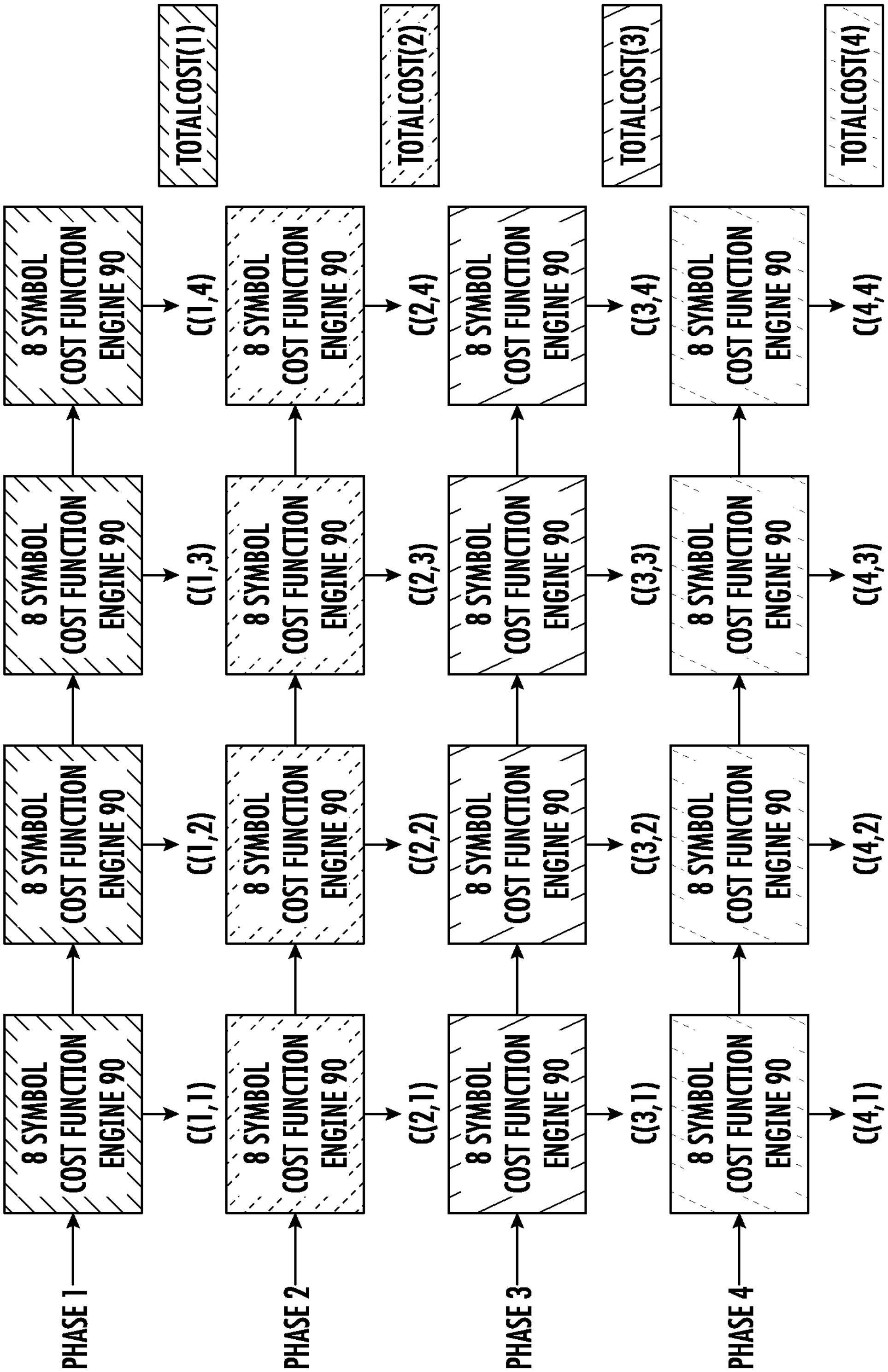
FIG. 5 shows a synchronization pattern detector that utilizes a plurality of cost function engines, wherein each processes eight symbols.

FIG. 5 shows a simplified block diagram of FIG. 3, which shows the nomenclature that will be used herein. The various rows represent a chain of four cost function engines 90, which each process 8 symbols, associated with a particular phase, while the rows represent the temporal position of the samples, such that the samples in the rightmost cost function engines 90 were received first. As explained, the data is oversampled, creating multiple phases, which are labelled as phase 1, 2, 3 and 4. Note that is the oversample rate is different from 4, the number of phases and rows would likewise change.

As explained above, each cost function engine 90 produces a partial cost value, which is represented as C(φ,n), where φ is the phase value and n is the placement of the block in its representative chain. Thus, the total cost for each phase (which is represented as a horizontal chain of cost function engines 90) can be written as:

$$TotalCost(\varphi) = \sum_{i=1}^{4} C(\varphi, i)$$

Note that there are four total cost values, one for each phase of the incoming data. These four cost values are identified using different crosshatching in the figures.

Now assume that the receiver baudrate is slightly higher than the transmit baudrate of the transmitter, such as about 1% faster. In this scenario, while the transmitter transmits 100 bits of data, the receiver will actually take 101 samples. In other words, the receiver inserts an extra symbol into the bit stream. Assume that this extra symbol is inserted exactly in the middle of the 128 symbols that are used by the Timing Circuit and Frequency Offset Detector 64. In other words, assume that the $64^{th}$ symbol is the extraneous inserted symbol.

Thus, to properly detect the synchronization pattern, it would be beneficial to simply ignore the $64^{th}$ symbol. In other words, the symbols used for the second total cost should be as follows:

[0, 4, 8, 12, 16, 20, 24, 28, 32, 36, 40, 44, 48, 52, 56, 60, 65, 69, 73, 77, 81, 85, 89, 93, 97, 101, 105, 109, 113, 117, 121, 125]

Similarly, the symbols used for the other total costs should normally utilize every fourth oversampled symbol. Note that every fourth oversampled symbol implies that there is a gap of three symbols between adjacent symbols. More generally, for an oversample rate of OSR, there are typically (OSR−1) symbols between adjacent symbols used for the cost calculation. However, in this scenario, there should be a gap of four oversampled symbols (i.e., OSR symbols) in the middle of the sequence.

Figure 6:
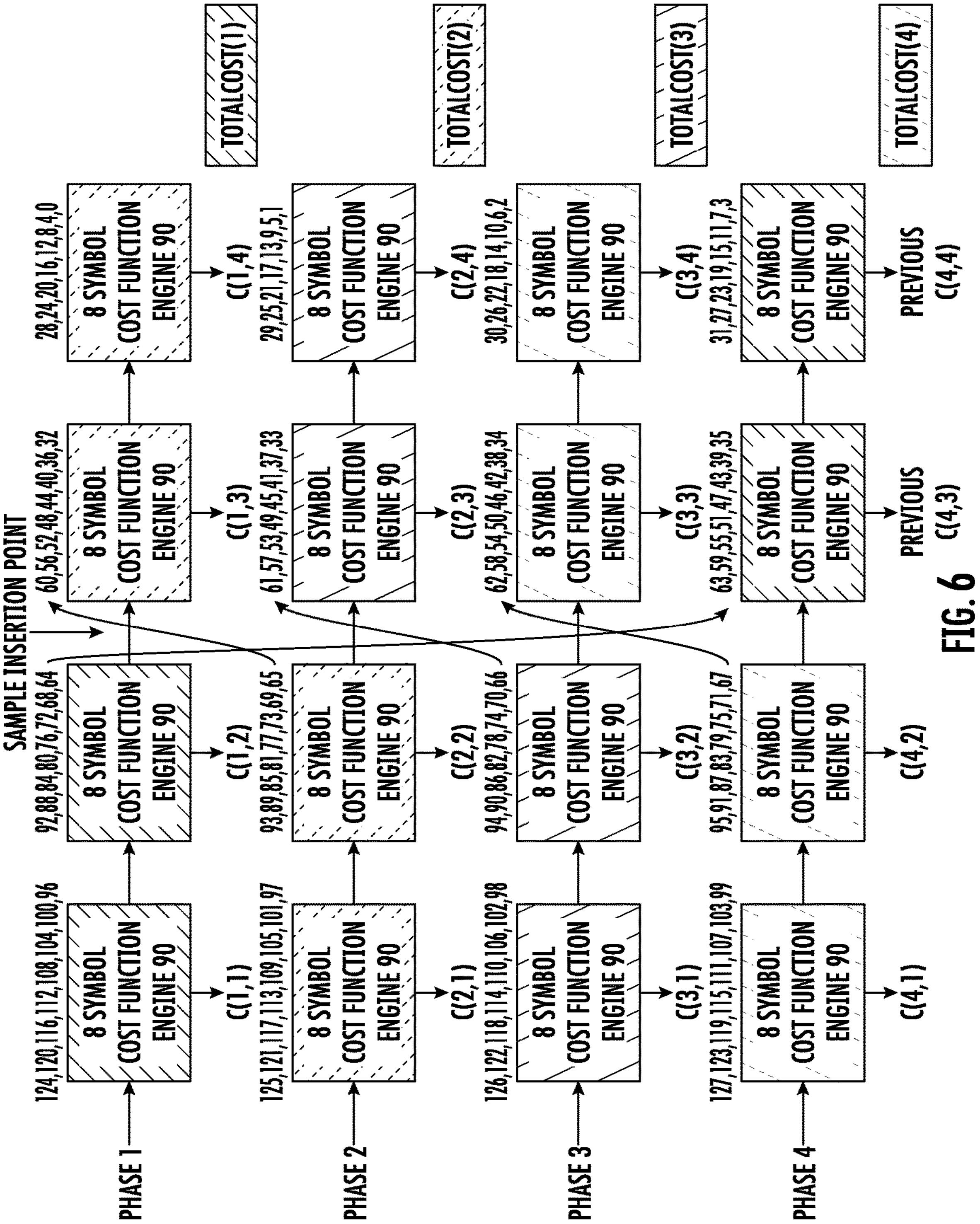
FIG. 6 shows cost calculations using the embodiment of FIG. 5 when a symbol is inserted.

FIG. 6 attempts to pictorially show this scenario. The oversampled symbol stream associated with the second total cost now comprises two cost function engines 90 that are part of the Phase 2 chain and two cost function engines 90 that are part of the Phase 1 chain. This is because the Phase 2 chain lags the Phase 1 chain by exactly 1 symbol. Thus, shifting from the Phase 1 chain to the Phase 2 chain has the effect of skipping over a symbol. Thus, for this scenario, the following partial costs are summed: C(2,1), C(2,2), C(1,3) and C(1,4).

Similarly, the oversampled symbol stream associated with the third total cost now comprises two cost function engines 90 that are part of the Phase 3 chain and two cost function engines 90 that are part of the Phase 2 chain. Thus, the partial costs that are summed are: C(3, 1), C(3, 2), C(2, 3) and C(2, 4). Likewise, the oversampled symbol stream associated with the fourth total cost now comprises two cost function engines 90 that are part of the Phase 4 chain and two cost function engines 90 that are part of the Phase 3 chain. Thus, the partial costs that are summed are: C(4,1), C(4,2), C(3,3) and C(3,4).

Lastly, the oversampled symbol stream associated with the first total cost now comprises two cost function engines 90 that are part of the Phase 1 chain and two cost function engines that are part of the Phase 4 chain. However, rather than lagging Phase 4 by 1 symbol, Phase 1 leads Phase 4 by three symbols. Therefore, it is necessary to use the previous symbols that were part of the cost function engines 90 in the Phase 4 chain. For example, the cost function engine 90 that generates C(4,3) uses symbols [35, 39, 43, 47, 51, 55, 59, 63]. However, symbol [63] is one less than symbol [64] (which is used by the cost function engine 90 that generates C(1,2)). Thus, to maintain a gap of four symbols, it is necessary to remove symbol [63] from the cost calculation. During the previous clock cycle, the cost function engine 90 that generates C(4,3) used symbols [31, 35, 39, 43, 47, 51, 55, 59]. This maintains the desired gap of four symbols (i.e., OSR symbols) between symbol [64] and symbol [59]. Therefore, the previous value of C(4,3) is used. Consequently, the previous value of C(4,4) must also be used. Therefore, in FIG. 6, the partial costs that are summed are: C(1,1), C(1,2), previous value of C(4,3) and previous value of C(4,4). In this way, the symbols used for this fourth total cost are:

[−1, 3, 7, 11, 15, 19, 23, 27, 31, 35, 39, 43, 47, 51, 55, 59, 64, 68, 72, 76, 80, 84, 88, 92, 96, 100, 104, 108, 112, 116, 120, 124].

Thus, each time a symbol is inserted, the cost function engines 90 that are used to calculate each total cost are changed. Specifically, the cost function engines 90 to the right of the inserted symbol are rotated upward (i.e., Phase 4 goes to Phase 3, Phase 3 goes to Phase 2, Phase 2 goes to Phase 1, and Phase 1 goes to Phase 4 using previous values). Further, any rotation from Phase 1 to Phase 4 also causes the previous values of the partial cost function engines to be used.

Figure 7:
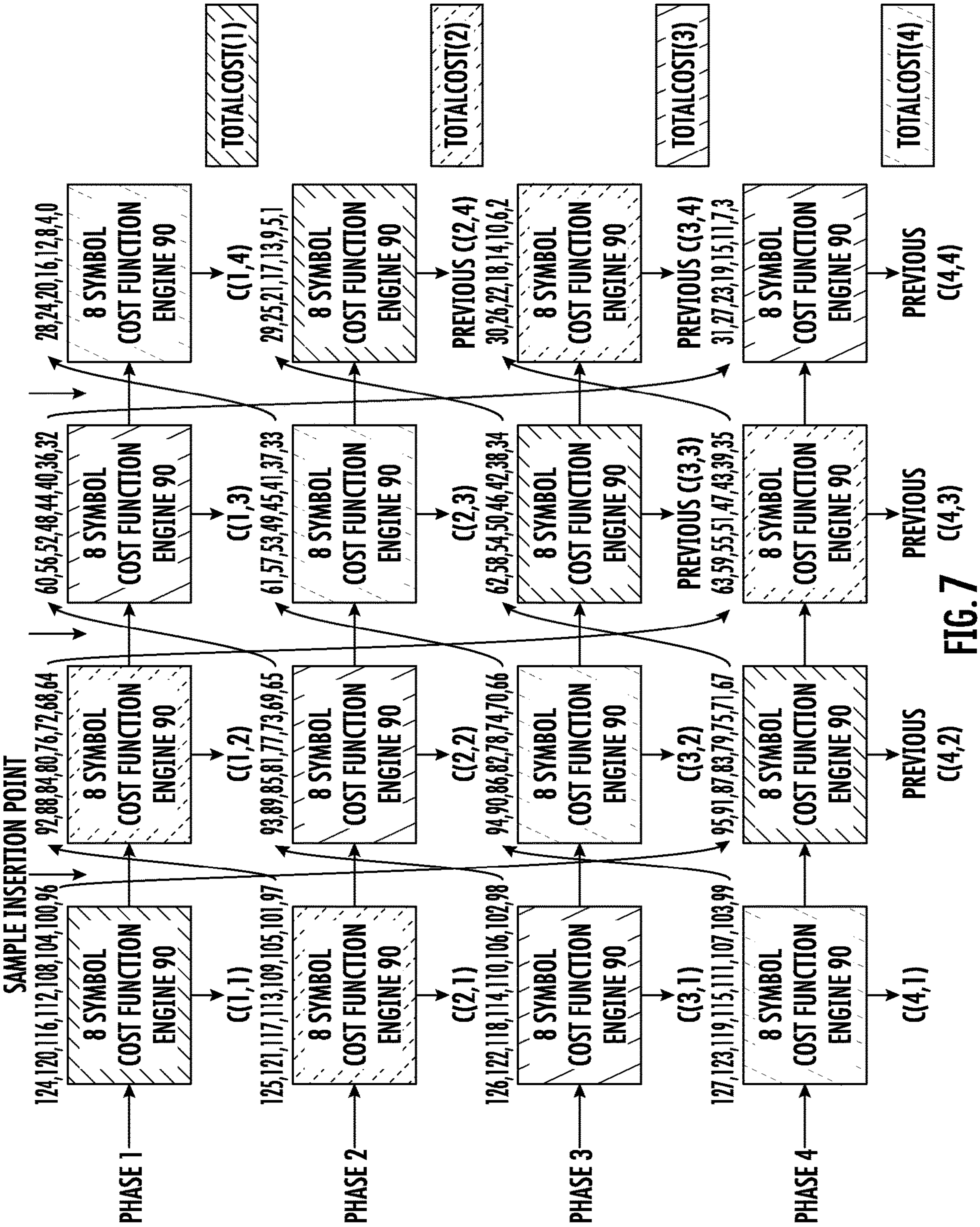
FIG. 7 shows cost calculations using the embodiment of FIG. 5 when three symbols are inserted.

This scheme can be extrapolated to show how the insertion of a symbol after every 32 symbols affects the calculations of the total costs. FIG. 7 shows this scenario. Note that a rotation occurs between each column of cost function engines 90. However, note that all of the total costs are calculated using four partial costs, where each is either a current value or the previous value calculated by a specific cost function engine 90. Further, note that once a previous value is used, all of the partial costs that are used after that must also be previous cost values.

Figure 8:
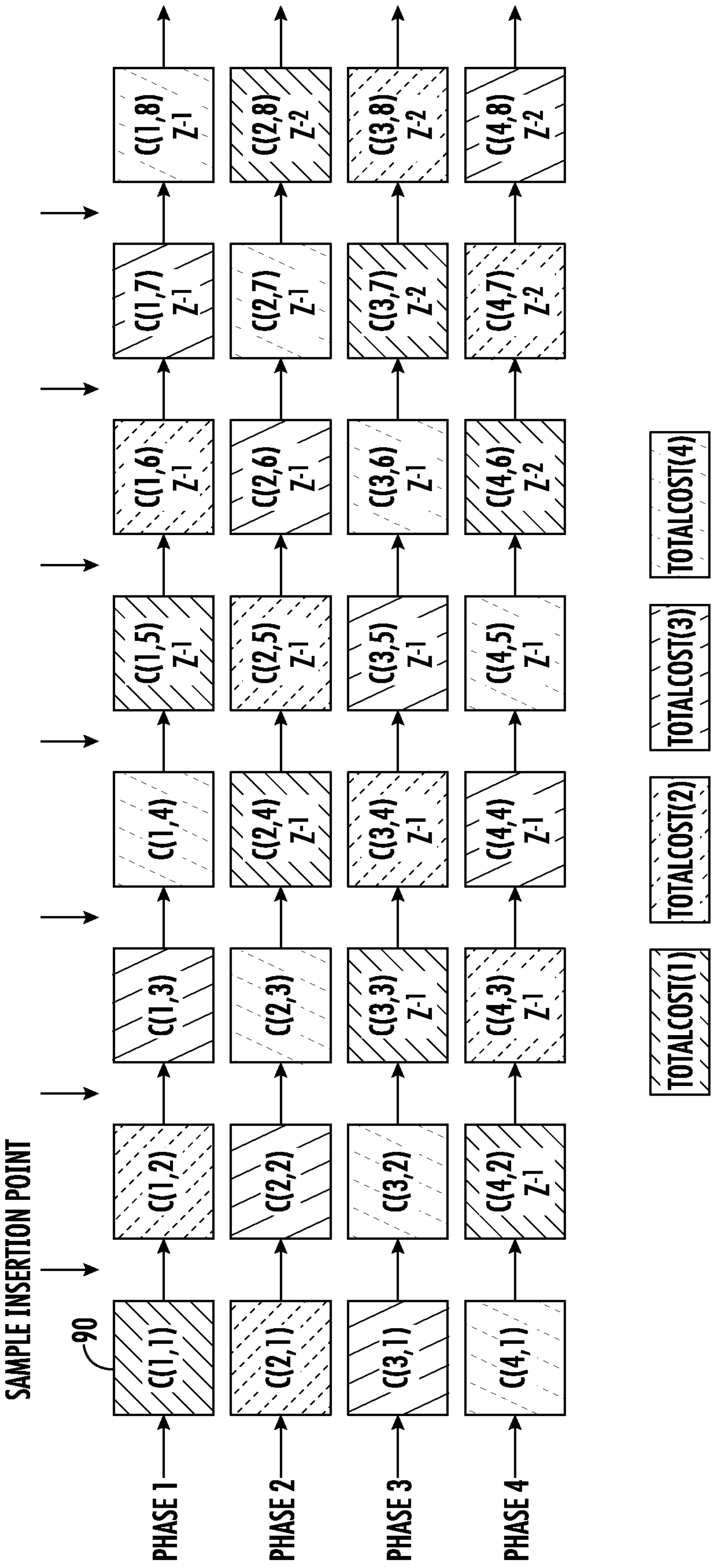
FIG. 8 shows cost calculations when seven symbols are inserted and each of the cost function engines processes four symbols.

FIG. 8 shows another variation of this scenario. In this embodiment, the cost function engines 90 each process only 4 samples. Therefore, eight columns are needed to receive the entire synchronization pattern. In this scenario, it is assumed that there is a symbol inserted every 16 symbols. As explained above, after each symbol insertion, there is an upward rotation. Further, rotations to Phase 4 also require the use of the previous value, which may be represented as $Z^{-1}$. Importantly, in this scenario, there are more than 4 rotations, so at least one chain rotates to Phase 4 twice. Since the previous value is used after the first rotation to Phase 4, the value before the previous value, which is the twice previous value (also represented as $Z^{-2}$) is used.

Thus, in this embodiments, the first cost value is calculated as:

$$\text{Cost }(1) = C(1,1) + C(4,2)Z^{-1} + C(3,3)Z^{-1} + C(2,4)Z^{-1} + C(1,5)Z^{-1} + C(4,6)Z^{-2} + C(3,7)Z^{-2} + C(2,8)Z^{-2}$$

The remaining three cost values are calculated in a similar manner.

In summary, if each cost function engine 90 processes eight symbols, the Timing Circuit and Frequency Offset Detector 64 may be able to properly find the synchronization pattern if 3 symbols are added to the 128 symbol stream. To do so, the Timing Circuit and Frequency Offset Detector 64 may save the current value of the partial cost from each cost function engine 90, as well as the previous partial cost ($Z^{-1}$) from each cost function engine 90. These various partial costs are then summed in various combinations to determine the total cost.

Further, if each cost function engine 90 processes four symbols, the Timing Circuit and Frequency Offset Detector 64 may be able to properly find the synchronization pattern if 7 symbols are added to the 128 symbol stream. To do so, the Timing Circuit and Frequency Offset Detector 64 may save the current value of the partial cost from each cost function engine 90, as well as the previous partial cost ($Z^{-1}$) and the twice previous partial cost ($Z^{-2}$) from each cost function engine 90.

This description explains the operation when the receiving node is operating with a receiver baudrate that is greater than the transmit baudrate. However, in certain embodiments, the receiver baudrate may be slower that the transmit baudrate. If this occurs, the Timing Circuit and Frequency Offset Detector 64 may actually have created fewer than 128 symbols during the synchronization pattern. Thus, in this embodiment, this appears as dropped symbols in the synchronization pattern.

Figure 9:
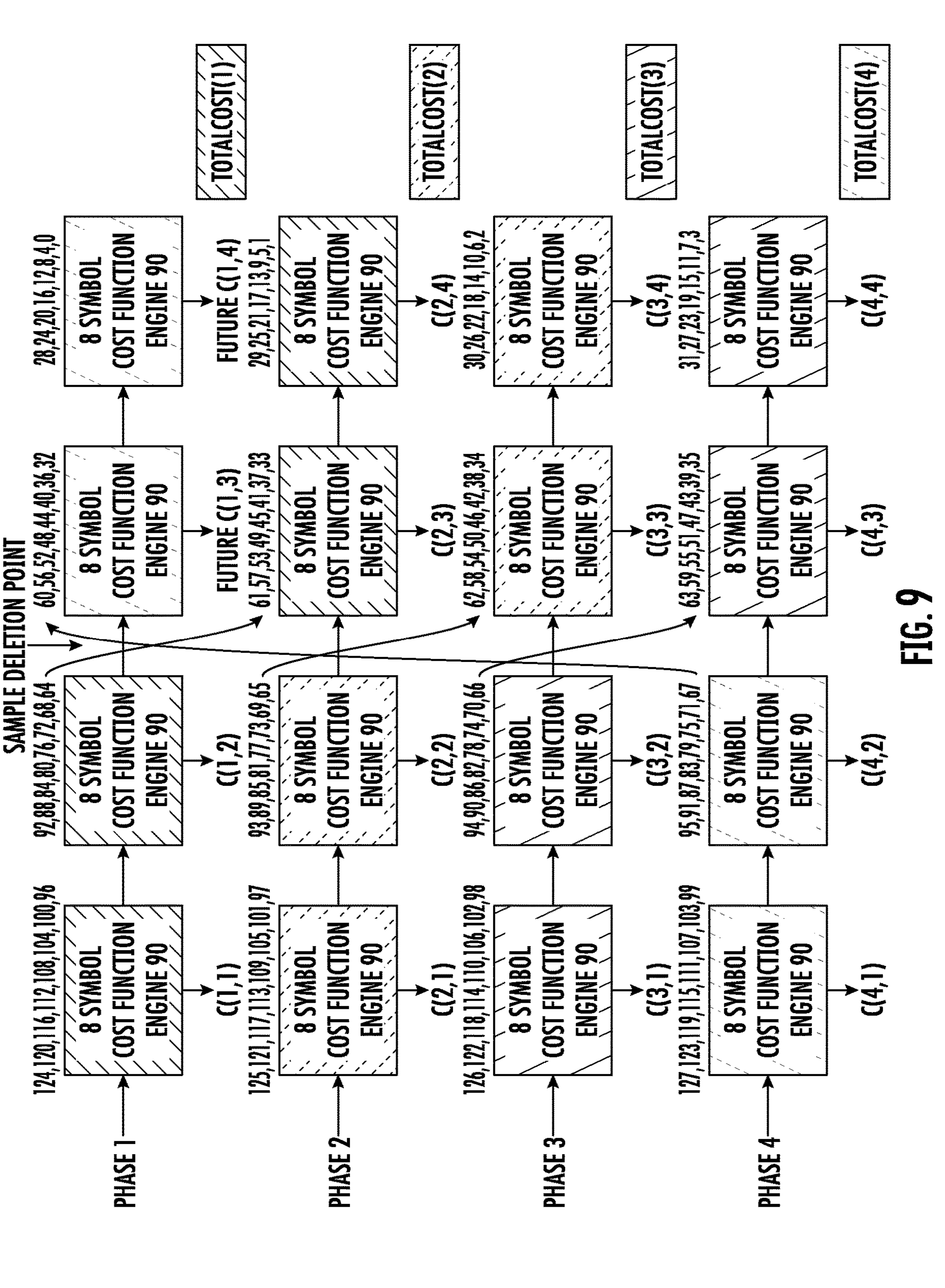
FIG. 9 shows cost calculations using the embodiment of FIG. 5 when a symbol is deleted.

Thus, to compensate for this, the symbol stream must be compressed by decreasing the gap between successive cost function engines 90. For example, as shown in FIG. 9, if the first total cost is calculated using C(1,1)+C(1,2)+C(2,3)+C(2,4), it uses 32 symbols that are typically separated by three symbols (i.e., OSR−1 symbols), but there is a gap of only two symbols in the middle of the sequence. Specifically, the symbols used in the calculation of the first total cost are:

[1, 5, 9, 13, 17, 21, 25, 29, 33, 37, 41, 45, 49, 53, 57, 61, 64, 68, 72, 76, 80, 84, 88, 92, 96, 100, 104, 108, 112, 116, 120, 124].

Note the gap of two symbols (i.e., OSR−2 symbols) between symbols 61 and 64. Similarly, the symbols used for the other total costs should normally utilize every fourth oversampled symbol, but there should be a gap of two oversampled symbols in the middle of the sequence.

Specifically, the oversampled symbol stream associated with the second total cost now comprises two cost function engines 90 that are part of the Phase 2 chain and two cost function engines 90 that are part of the Phase 3 chain. Thus, the partial costs that are summed are: C(2,1), C(2,2), C(3,3) and C(3,4). Likewise, the oversampled symbol stream associated with the third total cost now comprises two cost function engines 90 that are part of the Phase 3 chain and two cost function engines 90 that are part of the Phase 4 chain. Thus, the partial costs that are summed are: C(3,1), C(3,2), C(4,3) and C(4,4).

Lastly, the oversampled symbol stream associated with the fourth total cost now comprises two cost function engines 90 that are part of the Phase 4 chain and two cost function engines that are part of the Phase 1 chain. However, rather than lagging Phase 4 by 3 symbols, Phase 1 lags Phase 4 by seven symbols. Therefore, it is necessary to use the symbols that will be part of the cost function engines 90 in the future. For example, the cost function engine 90 that generates C(1,3) uses symbols [32, 36, 40, 44, 48, 52, 56, 60]. However, symbol [60] is seven less than symbol [67] (which is used by the cost function engine 90 that generates C(4,2)). Thus, to maintain a gap of two symbols, it is necessary to include symbol [64] in the cost calculation. During the next clock cycle, the cost function engine 90 that generates C(1,3) uses symbols [36, 40, 44, 48, 52, 56, 60, 64]. This maintains the desired gap of two symbols between symbol [64] and symbol [67]. Therefore, the future value of C(1,3) is used. Consequently, the future value of C(1,4) must also be used. Therefore, in FIG. 9, the partial costs that are summed are: C(4, 1), C(4, 2), future value of C(1,3) and future value of C(1,4). In this way, the symbols used for this cost are:

[4, 8, 12, 16, 20, 24, 28, 32, 36, 40, 44, 48, 52, 56, 60, 64, 67, 71, 75, 79, 83, 87, 91, 95, 99, 103, 107, 111, 115, 119, 123, 127].

Thus, each time a symbol is deleted, the cost function engines 90 that are used to calculate the total cost are changed. Specifically, the cost function engines 90 to the right of the deleted symbol are rotated downward (i.e., Phase 4 goes to Phase 1 using future values, Phase 3 goes to Phase 4, Phase 2 goes to Phase 3, and Phase 1 goes to Phase 2). Each rotation from Phase 4 to Phase 1 requires the use of a future value.

Figure 10:
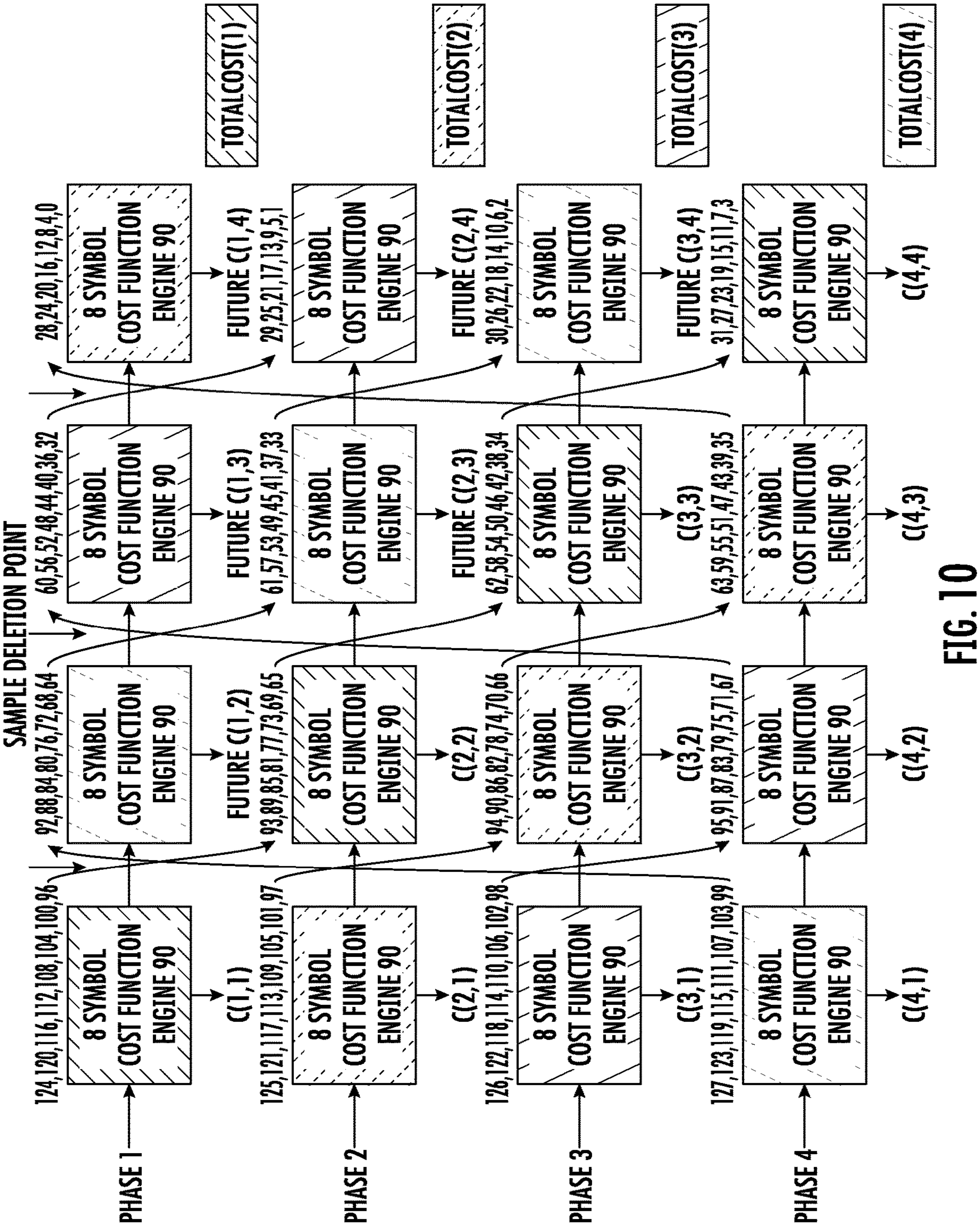
FIG. 10 shows cost calculations using the embodiment of FIG. 5 when three symbols are deleted.

This scheme can be extrapolated to show how the deletion of a symbol after every 32 symbols affects the calculations of the total costs. FIG. 10 shows this scenario. Note that a rotation occurs between each column of cost function engines 90. However, note that all of the total costs are calculated using four partial costs, where each is either a current value or the future value calculated by a specific cost function engine 90. Further, note that once a future value is used, all of the partial costs that are used for this total cost calculation after that must also be future cost values.

Figure 11:
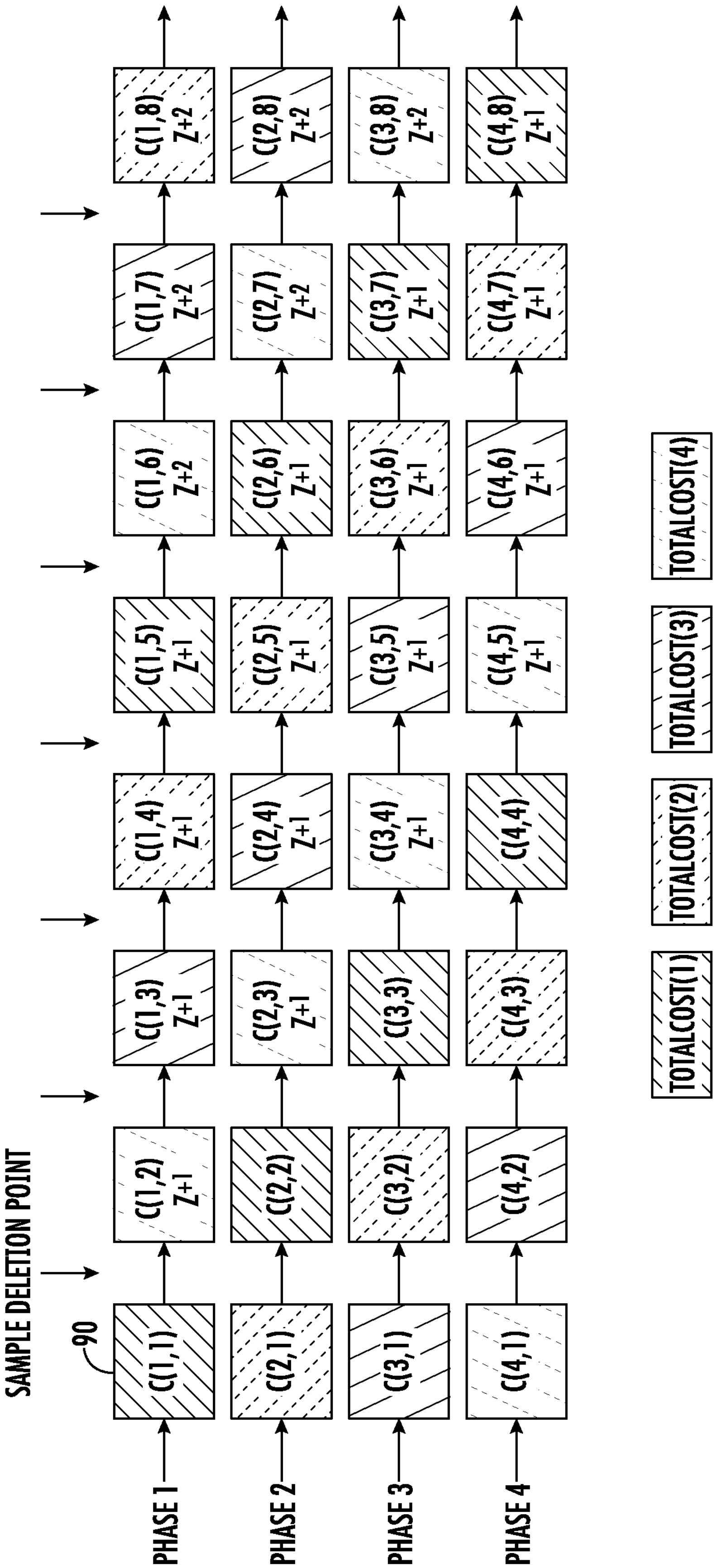
FIG. 11 shows cost calculations when seven symbols are deleted and each of the cost function engines processes four symbols.

FIG. 11 shows another variation of this scenario. In this embodiment, the cost function engines 90 each process only 4 samples. Therefore, eight columns are needed to receive the entire synchronization pattern. In this scenario, it is assumed that there is a symbol deleted every 16 symbols. As explained above, after each symbol deletion, there is an downward rotation. Further, rotations to Phase 1 also require the use of the future value, which may be represented as $Z^{+1}$. Importantly, in this scenario, there are more than 4 rotations, so at least one chain rotates to Phase 1 twice. Since the future value is used after the first rotation to Phase 4, the value after the future value, which is the twice future value (also represented as $Z^{+2}$) is used.

Thus, in this embodiment, the second cost value is calculated as:

$$\text{Cost }(2) = C(2,1) + C(3,2) + C(4,3) + C(1,4)Z^{+1} + C(2,5)Z^{z+1} + C(3,6)Z^{+1} + C(4,7)Z^{+1} + C(1,8)Z^{+2}$$

The remaining three cost values are calculated in a similar manner.

In summary, if each cost function engine 90 processes eight symbols, the Timing Circuit and Frequency Offset Detector 64 may be able to properly find the synchronization pattern if 3 symbols are deleted from the 128 symbol stream. To do so, the Timing Circuit and Frequency Offset Detector 64 may save the current value of the partial cost from each cost function engine 90, as well as the future partial cost ($Z^{+1}$) from each cost function engine 90.

Further, if each cost function engine 90 processes four symbols, the Timing Circuit and Frequency Offset Detector 64 may be able to properly find the synchronization pattern if 7 symbols are deleted to the 128 symbol stream. To do so, the Timing Circuit and Frequency Offset Detector 64 may save the current value of the partial cost from each cost function engine 90, as well as the future partial cost ($Z^{+1}$) and the twice future partial cost ($Z^{+2}$) from each cost function engine 90.

Combining FIGS. 7 and 10, it can be seen that, if each cost function engine 90 processes eight symbols, the Timing Circuit and Frequency Offset Detector 64 may be able to properly find the synchronization pattern if 3 symbols are added or deleted to the 128 symbol stream. To do so, the Timing Circuit and Frequency Offset Detector 64 may save the current value of the partial cost from each cost function engine 90, as well as the previous partial cost ($Z^{-1}$) and the future partial cost ($Z^{+1}$) from each cost function engine 90. However, to do so, it may be necessary to combine different partial costs from each column to generate the lowest total cost. For example, for 0 deletions or insertions, the partial costs along a row will yield the lowest total cost (see FIG. 5). For 1 deletion or insertion, two adjacent partial costs from one row added to two adjacent partial costs from a different row will yield the lowest total cost (see FIG. 6 and FIG. 9). As shown in FIGS. 7 and 10, one partial cost from each row yields the lowest total cost if 3 insertions or deletions are present. Further, other numbers of insertions and deletions and different placements of these alterations would require different combinations of partial costs to be summed.

Figure 12A:
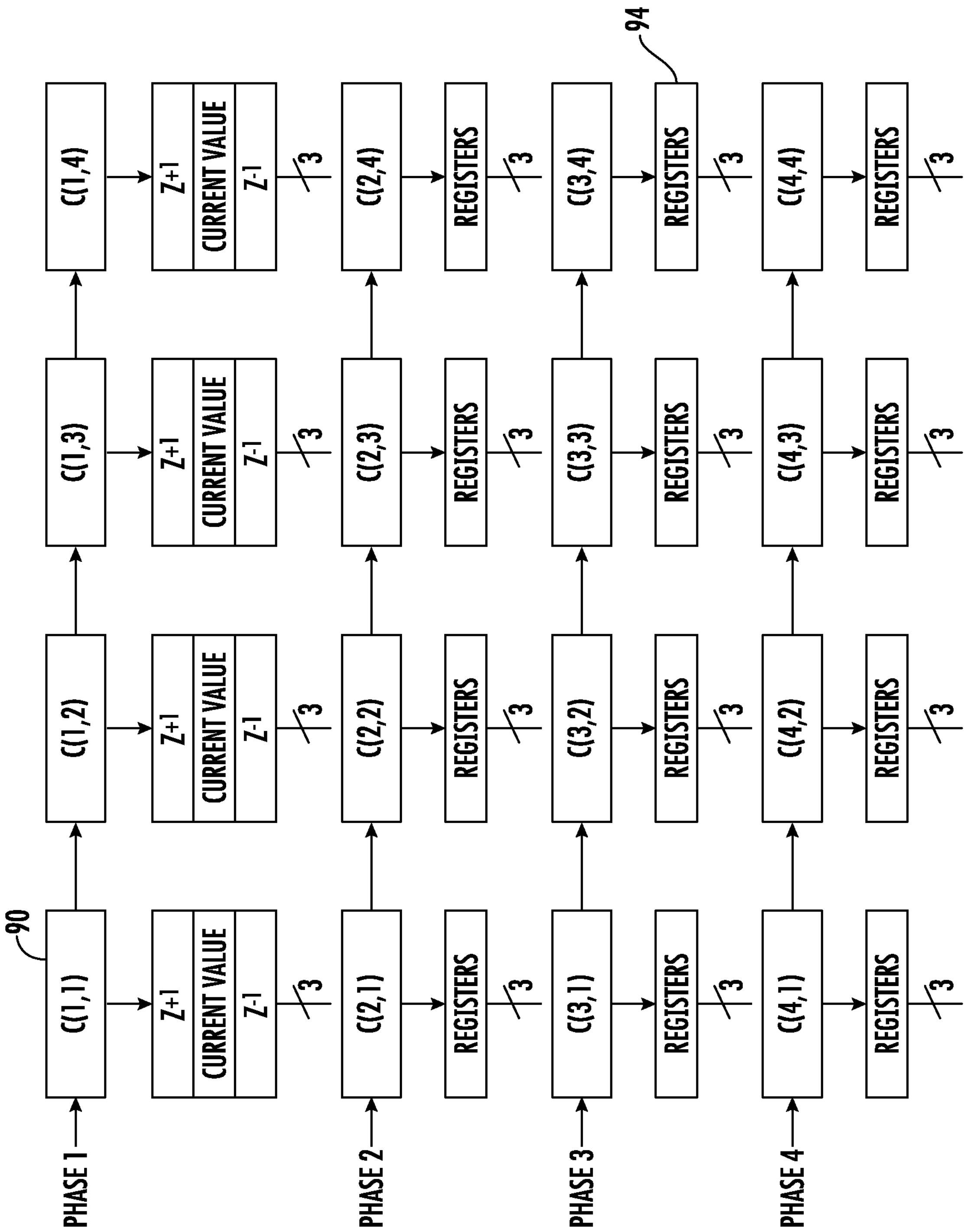
FIG. 12A shows a portion of the Timing Recovery and Synchronization circuit illustrating the cost function engines and corresponding shift registers.
Figure 12B:
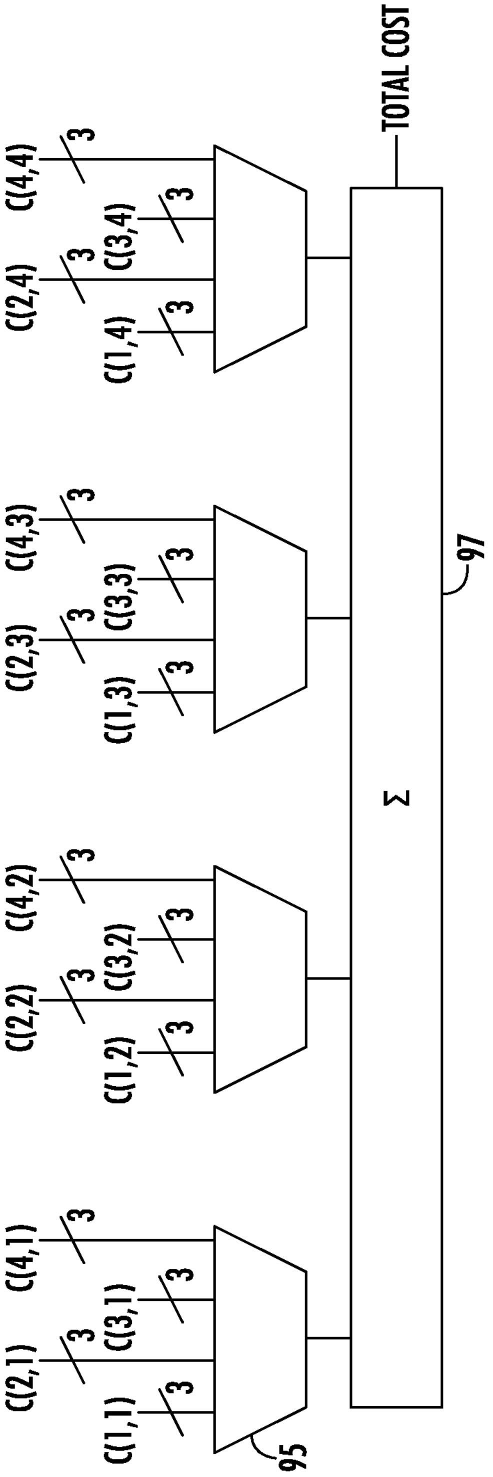
FIG. 12B shows a circuit to compute all possible costs.
Figure 12C:
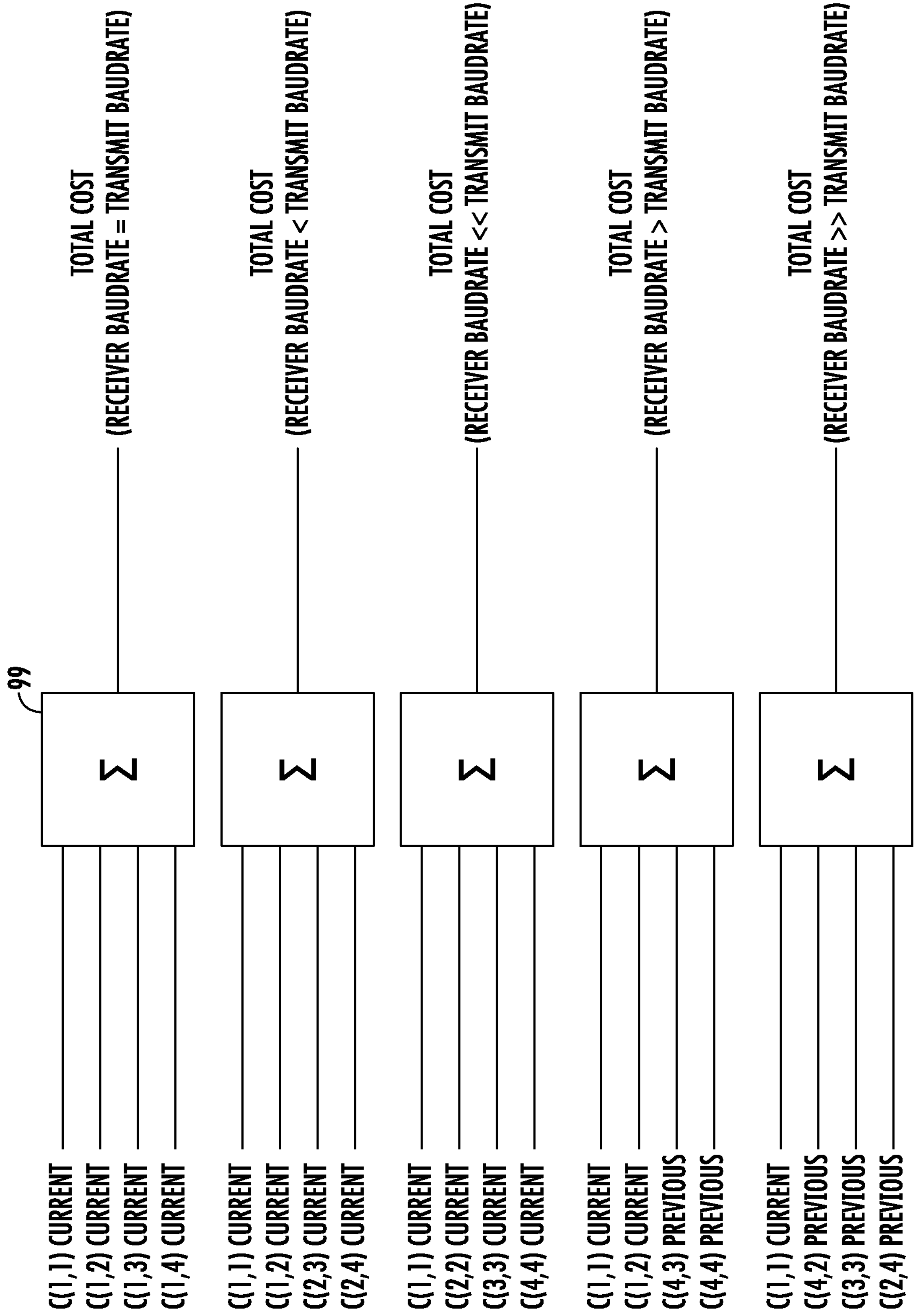
FIG. 12C shows a circuit which uses the outputs from the shift registers to selectively calculate total costs.

Thus, to find the lowest total cost, various combinations of the partial costs must be summed together. FIGS. 12A-12B show one configuration that may be used, while FIGS. 12A and 12C show a second embodiment. FIGS. 12B and 12C only show the circuitry associated with the total cost of Phase 1. This circuitry would be duplicated with the other phases. As shown in FIG. 12A, there is a shift register 94 associated with each cost function engine 90. This shift register is used to save the last three values calculated by that cost function engine 90. In this way, the oldest value in the shift register is referred to as the previous value ($Z^{-1}$), and the newest value in the shift register is referred to as the future value ($Z^{+1}$). Consequently, the middle value in the shift register is treated as the current value. Note that these three values are necessary to compute the total costs that are illustrated in FIGS. 5-7, 9-10.

These three values from each cost function engine 90 may then be used in various combinations to determine the total cost. In the embodiment shown in FIG. 12B, the outputs from all of the shift registers 94 in the first column (C((1,1) . . . C(4,1)) are provided as the inputs to a first multiplexer 95, the outputs from all of the shift registers 94 in the second column (C(1,2) . . . C(4,2)) are provided as inputs to a second multiplexer 95, and so on. In this way, by proper selection of the control signals to the multiplexers, any desired total cost may be calculated.

However, this approach requires many multiplexers and many addition operations. Therefore, in certain embodiments, the first multiplexer 95 may be simplified, as for all total costs illustrated herein, the current value of the first column is always used. Additionally, as shown in FIGS. 6, 7 and 10, there are only three possible values used for the second multiplexer (i.e. the current value of C(1,2); the current value of C(2,2) or the previous value of C(4,2)). Thus, this multiplexer may be reduced in dimension. Similarly, the possible values of the third and fourth columns may also be determined and only these values may be used in the third and fourth multiplexers, respectively. This approach allows computation of every possible total cost.

The Timing Circuit and Frequency Offset Detector 64 then performs the summing operations using summing circuit 97 to calculate total costs for various scenarios. The Timing Circuit and Frequency Offset Detector 64 compares each possible total cost to a predetermined threshold. If one of the calculated total costs is less than this predetermined threshold, it is assumed that the synchronization pattern has been found. Further, if multiple total costs are less than the predetermined threshold, the smallest one is considered to be correct. Note that in some embodiments, the multiplexers 95 and the summing circuit 97 may be replaced by a plurality of summing circuits, where each calculates one total cost. This is shown in FIG. 12C and described below.

However, in some embodiments, the number of total costs that are calculated may be further reduced. For example, the Timing Circuit and Frequency Offset Detector 64 may only calculate the total cost for 5 different scenarios:

- receiver baudrate equal to transmit baudrate (see FIG. 5);
- receiver baudrate less than transmit baudrate (see FIG. 9);
- receiver baudrate much less than transmit baudrate (see FIG. 10);
- receiver baudrate greater than transmit baudrate (see FIG. 6); and
- receiver baudrate much greater than transmit baudrate (see FIG. 7).

Figure 12D:
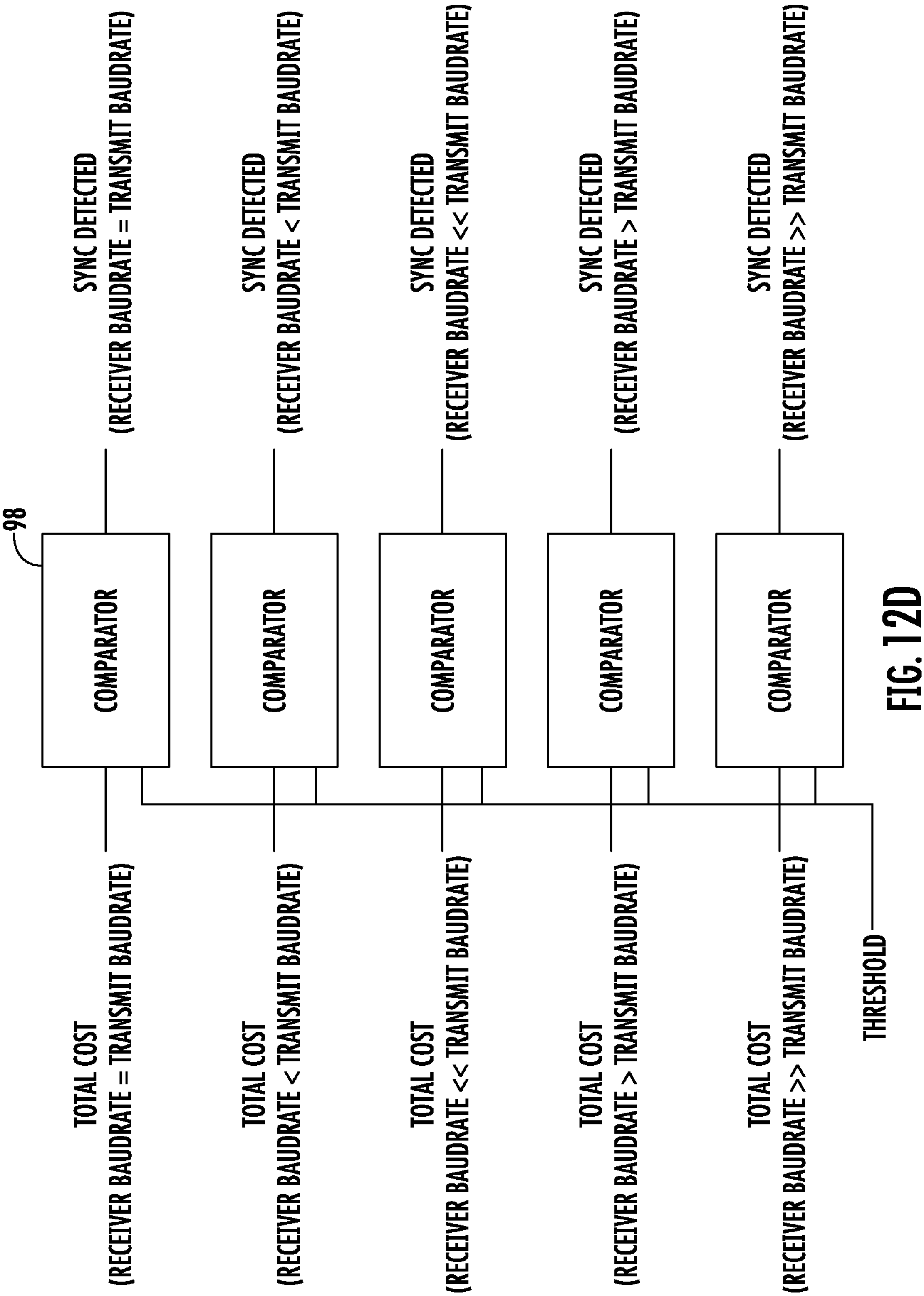
FIG. 12D shows a circuit to detect the synchronization pattern using the outputs from FIG. 12C.

This scenario is shown in FIG. 12C. Note that FIG. 12C shows the summing circuits 99 used for the first total cost. Similar circuitry is required for the other total costs. Note that while this figure shows total costs based on 5 scenarios, the number of scenarios may be more or less than this. For example, in addition to or alternatively, a scenario where two symbols are added or deleted may be used. Further, as shown in FIG. 12D, the five total costs shown in FIG. 12C are each compared to the predetermined threshold using comparators 98 to determine whether the synchronization pattern is present. If the total cost generated by any of the summing circuits 99 is less than the predetermined threshold, it is assumed that the synchronization pattern has been detected.

Based on simulations, these five scenarios may be sufficient to detect the synchronization pattern almost as well as performing an exhaustive set of calculations.

This same approach may be used with the configuration shown in FIGS. 8 and 11. In this configuration, there is a shift register associated with each of the 32 cost function engines 90. However, unlike FIG. 12A, each shift register contains five values, the twice previous value ($Z^{-2}$), the previous value ($Z^{-1}$), the current value, the future value ($Z^{+1}$) and the twice future value ($Z^{+2}$). As explained above, these five values can then be used with a summing circuit 91 to calculate different total costs.

The use of multiplexers 95 would result in far too many combinations. Therefore, the Timing Circuit and Frequency Offset Detector 64 may include a circuit similar to FIGS. 12C and 12D, where the total costs of only a limited number of scenarios are calculated using summing circuits 99 and compared to the threshold. Thus, in certain embodiments, the Timing Circuit and Frequency Offset Detector 64 may use total costs from less than 20 scenarios, and compare these total costs with the predetermined threshold. In some embodiments, the number of scenarios may be less than 10. These scenarios may include:

1. Receiver baudrate equal to transmit baudrate (0 insertions/deletions);
2. Receiver baudrate slightly faster than transmit baudrate (1-4 symbols inserted);
3. Receiver baudrate faster than transmit baudrate (5-6 symbols inserted);
4. Receiver baudrate much faster than transmit baudrate (7 symbols inserted);
5. Receiver baudrate slightly slower than transmit baudrate (1-4 symbols deleted);
6. Receiver baudrate slower than transmit baudrate (5-6 symbols deleted); and
7. Receiver baudrate much slower than transmit baudrate (7 symbols deleted).

The selection of the exact number and position of the symbols that are inserted or deleted in scenarios 2, 3, 5 and 6 may be implementation dependent.

Thus, in this embodiment, each cost function engine 90 has an associated shift register that saves one or more previous values, one or more future values, and the current value. The various outputs from these shift registers are then combined in different ways to calculate a plurality of total costs. As explained above, the combinations may be selected so as to cover a limited number of scenarios where the receiver baudrate is equal to, faster than and slower than the transmit baudrate. Further, the combinations may also include scenarios wherein the magnitude of the difference between the receiver baudrate and the transmit baudrate is varied.

The outputs from each of these summing circuits 99, which represent the total costs for these scenarios, is then compared to the predetermined threshold as shown in FIG. 12D. If any of these outputs are less than the predetermined threshold, then the synchronization pattern is detected.

Stated differently, the Timing Circuit and Frequency Offset Detector 64 receives a bit stream, which contains multiple samples per data bit. The number of samples per data bit is referred to as the oversample rate (OSR). Thus, there are OSR samples per data bit. The Timing Circuit and Frequency Offset Detector 64 compares various combinations of these samples to a predetermined threshold to detect the synchronization pattern. If the transmit baudrate of the transmitting device is the same as the receiver baudrate of the network device, then the synchronization pattern will be found in a bit stream which is selected such that the samples used by the cost function engines is separated by gaps of (OSR−1) samples. Thus, the symbol stream may be the samples at positions: n+ (m−1)*OSR, where n is an integer from 0 to OSR−1 and m is an integer from 1 to the length of the synchronization pattern. In this bit stream, there is a gap of (OSR−1) samples between successive samples that are used. In other words, if one sample is at position n, the next is at position n+OSR. However, if the receiver baudrate of the network device is greater than the transmit baudrate, it is necessary to skip samples in the bit stream, such that there are one or more gaps of more than (OSR−1) samples between successive samples that are used. For example, FIG. 6 shows one gap of (OSR) samples, FIG. 7 shows three gaps of (OSR) samples and FIG. 8 shows seven gaps of (OSR) samples. Note that the number of gaps of (OSR) samples is indicative of the magnitude of the difference in frequency between the transmit baudrate and the receiver baudrate used by the network device 10. Additionally, if the receiver baudrate of the network device is less than the transmit baudrate, it is necessary to compress samples in the symbol stream, such that there are one or more gaps of less than (OSR−1) samples between successive samples that are used. For example, FIG. 9 shows one gap of (OSR−2) samples, FIG. 10 shows three gaps of (OSR−2) samples and FIG. 11 shows seven gaps of (OSR−2) samples. Note that the number of gaps of (OSR−2) samples is indicative of the magnitude of the difference in frequency between the transmit baudrate and the receiver baudrate used by the network device 10.

In addition to detecting the synchronization pattern, the Timing Circuit and Frequency Offset Detector 64 may serve other purposes as well. For example, the scenario that generated the lowest cost also provides information about the receiver baudrate, relative to the transmit baudrate. For example, if the total cost associated with scenario 1 listed above is the lowest, then the two baudrates are operating at very close to the same frequency, and no extra steps need to be taken. If, however, the total cost associated with scenario 4 or scenario 7 is the lowest, then there is a large mismatch between these baudrates. This information from the Timing Circuit and Frequency Offset Detector 64 can be used in several different ways.

In one embodiment, the frequency of the output from the sample clock generator 57 that triggers conversions by the ADC 55 is increased or decreased based on the direction and severity of the baudrate offset information from the Timing Circuit and Frequency Offset Detector 64. For example, the severity of the baudrate offset may be categorized as small (scenarios 2 and 5 above), medium (scenarios 3 and 6 above) or large (scenarios 4 and 7 above). Based on this categorization, the frequency of the sample clock generator 57 may be adjusted by 3%, 6%, or 9%, respectively. Of course, other adjustments may be used as well.

In another embodiment, rather than changing the sample rate of the ADC 55, the settings of Sample Rate Converter 58 are modified. In this way, the $I_{OSR}$ and $Q_{OSR}$ signals are generated at a slightly different sample rate. The change in the sample rate may be based on the direction and severity of the baudrate offset information from the Timing Circuit and Frequency Offset Detector 64. Thus, rather than generating $I_{OSR}$ and $Q_{OSR}$ samples at a 4 MHz rate (which is 4 time oversampling of 1 Mb BLE), the Sample Rate Converter 58 may generate samples at a sample rate slightly higher or lower than 4 MHz.

In another embodiment, the Timing Circuit and Frequency Offset Detector 64 may be used to determine which samples are provided to the Decision Device 66 or any other downstream components. As described above, the various samples may be stored in a sample memory 63 as they are captured. This sample memory 63 may be a part of the data memory device 40 or a different memory device. Samples are then read from the sample memory 63 based on the scenario that provided the lowest cost. For example, if scenario 1 listed above is the lowest, then there is no significant baudrate offset to adjust for and samples are read from the sample memory 63 by regularly skipping OSR−1 samples. If, however, the cost of scenario 7 is the lowest which was calculated by deleting a sample every $4^{th}$ sample, as described above, the samples corresponding to the sample indices used to calculate the cost are read from the sample memory 63 and passed to the Decision Device 66 or any other downstream component.

Each of these baudrate offset correction methods may be implemented by changing various parameters associated with the read circuit. Note that any of these baudrate offset correction methods can be applied to the packet as it is being received or this information can be stored and used in consecutive packets received from the same transmitter. For example, the network device may store an indication of the difference between the receiver baudrate and the transmit baudrate for each transmitting device. When a subsequent packet is received from that transmitting device, the network device may use the indication to set the various parameters in the read circuit.

Also, the adjustments can be made in one step to compensate for the entire offset as determined by the Timing Circuit and Frequency Offset Detector 64 or applied iteratively in smaller steps. For example, if a large difference is detected, the parameters of the read circuit may be modified so as to attempt to completely eliminate this large difference. In other embodiments, smaller modifications to these parameters may be made to reduce the magnitude of the difference.

While the disclosure is described above with respect to cost function engines, it is understood that other pattern detectors may be used. Specifically, a cost function engine is a particular type of pattern detector which seeks to minimize a difference between the desired synchronization pattern and the incoming data. A correlator is a pattern detector that operates differently, in that it seeks to maximize the correlation between the desired synchronization pattern and the incoming data. Thus, while a cost function engine seeks to minimize its output, a correlator seeks to maximize its output.

Figure 14:
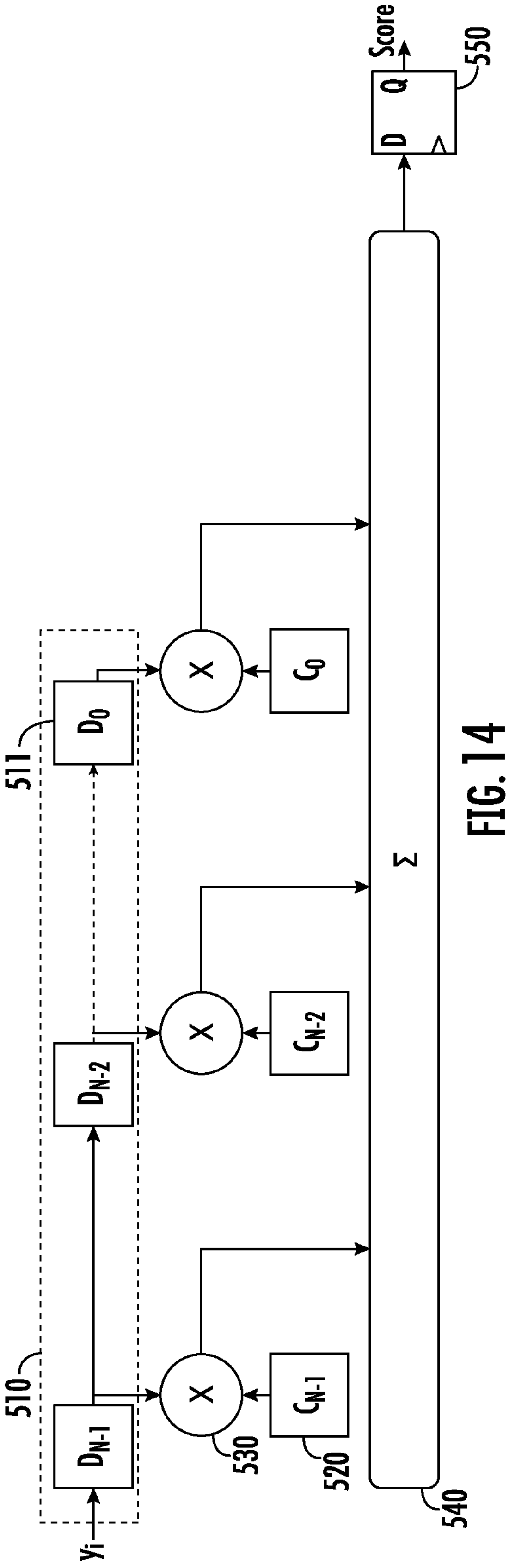
FIG. 14 shows a correlator according to one embodiment.

FIG. 14 shows a correlator 500 according to one embodiment. In this embodiment, the incoming data samples enter a shift register 510, which is made up of a plurality of storage devices 511, such as flip-flops or memory locations. As each new data sample enters the shift register 510, the data sample in each storage device 511 is moved to the adjacent storage device, such that the shift register 510 contains the most recently received N data samples, where N is the length of the shift register. In some embodiments, the synchronization pattern may be 32 bits. In these embodiments, N may be a number which is a factor of 32, such as 8 or 4.

The output of each storage device 511 is also used as an input to a multiplier 530. The other input to each multiplier 530 is the correlation value 520 for that particular bit, which depends on the synchronization pattern being detected. The correlation value 520 may be stored in a storage element, such as a set of flip-flops or a memory location.

The output of each multiplier 530 is provided to a summing circuit 540. In some embodiments, the output of the summing circuit 540 is then used to hold the partial correlation score using partial correlation storage element 550.

In certain embodiments, the multiplier is simplified as the values of the correlation values are limited to −1 and 1. In this way, the multiplier 530 either simply passes the value from the storage device 511 or creates the additive inverse of that value.

In operation, the correlator seeks to maximize its correlation score, which may occur when the polarity of the input data matches the desired correlation pattern. In this scenario, absolute values of the 32 bits of the synchronization pattern are added together to yield the total correlation score. The synchronization pattern detector then compares this total correlation score to a predetermined threshold to determine whether the sync pattern has been detected.

Thus, the correlator is very similar to the cost function engine, except rather than seeking to minimize cost, it seeks to maximize the correlation score.

Figure 15:
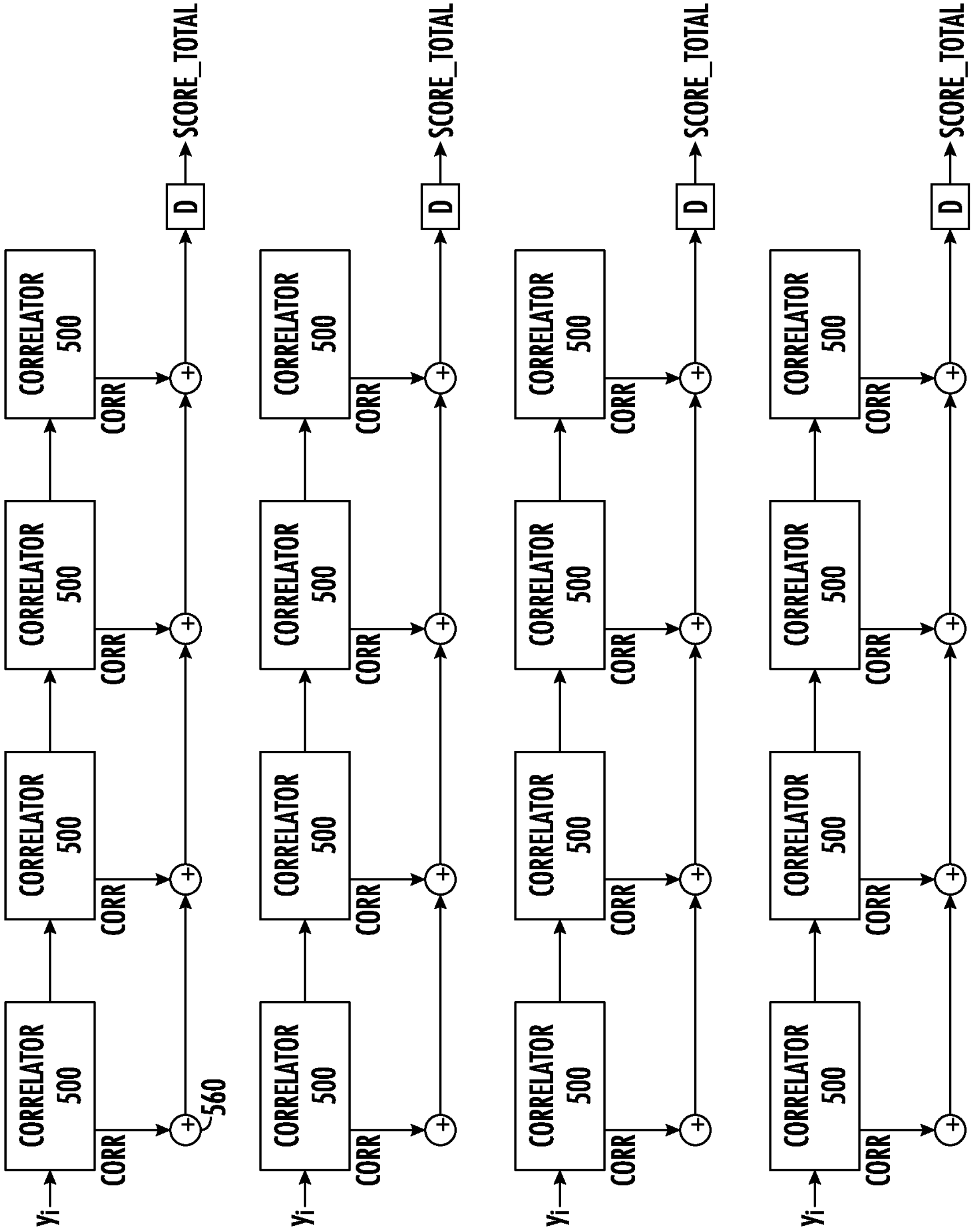
FIG. 15 shows a synchronization pattern detector that utilizes a plurality of correlators, wherein each processes eight symbols.

The circuit shown in FIG. 14, which is the correlator 500, is replicated a plurality of times, depending on the amount of oversampling that is performed, and the number of symbols processed by each correlator 500. If each correlator 500 processes 8 symbols and the oversampling rate (OSR) is 4, there are 16 copies of the circuit, arranged as 32/8 columns and OSR rows, as shown in FIG. 15. Of course, the oversample rate may be changed, which would result in a different number of rows. Additionally, the number of symbols processed by each correlator 500 may be varied, which affects the number of columns in the 2 dimensional array.

A summing circuit 560 is used to sum the partial correlation scores from the correlators 500 to create the total correlation score.

Note that the scenarios described with respect to FIGS. 6-11 are equally applicable to the correlator 500. The only difference, as noted above, is that, for the total correlation score, a maximum value is desired. Thus, as was described with the cost function engines 90, rotations may occur each time a sample is inserted or deleted. Additionally, the previous or future values are used when there is a rotation between the first row and the last row.

Figure 16:
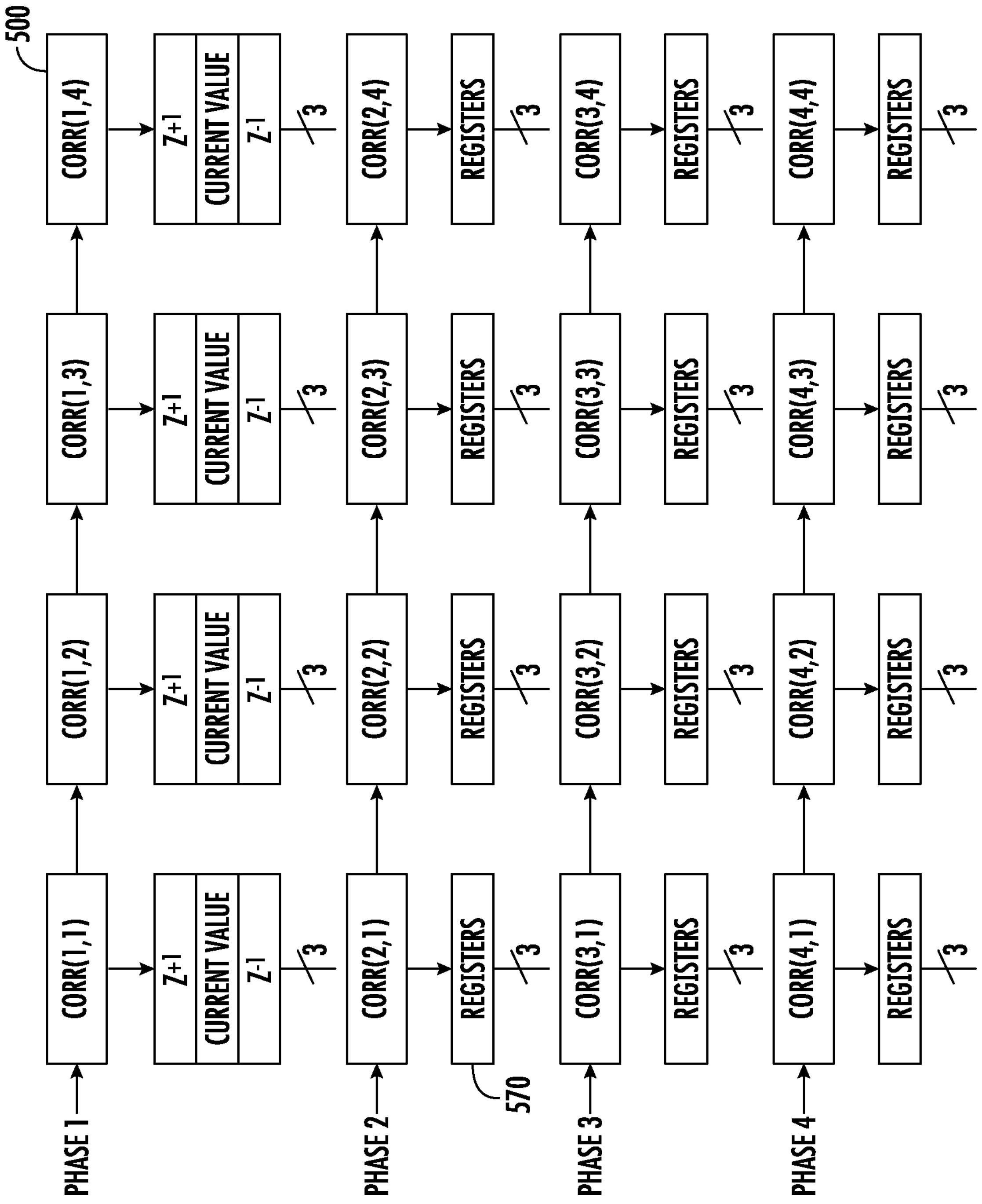
FIG. 16 shows a portion of the Timing Recovery and Synchronization circuit illustrating the correlators and corresponding shift registers.

FIG. 16 shows a portion of the Timing Recovery and Synchronization circuit illustrating the correlators 500 and corresponding shift registers 570. This configuration may be used when the OSR=4 and each correlator 500 processes 8 samples. In this embodiment, each shift register 570 contains a current partial correlation score, a previous partial correlation score and a future partial correlation score. As described above with respect to the cost function engines, if each correlator 500 processes 4 samples, there may be 5 registers in the shift register 570; a current partial correlation score, a previous partial correlation score, a twice previous partial correlation score, a future partial correlation score and a twice future partial correlation score.

Thus, the outputs from the shift registers 570 may be combined in the manner shown in FIG. 12B, where it is possible to total the partial correlation scores using exactly one correlator 500 from each column. Of course, the output of the summing circuit in this embodiment would be Total Correlation_Score, rather than Total_Cost.

Figure 17A:
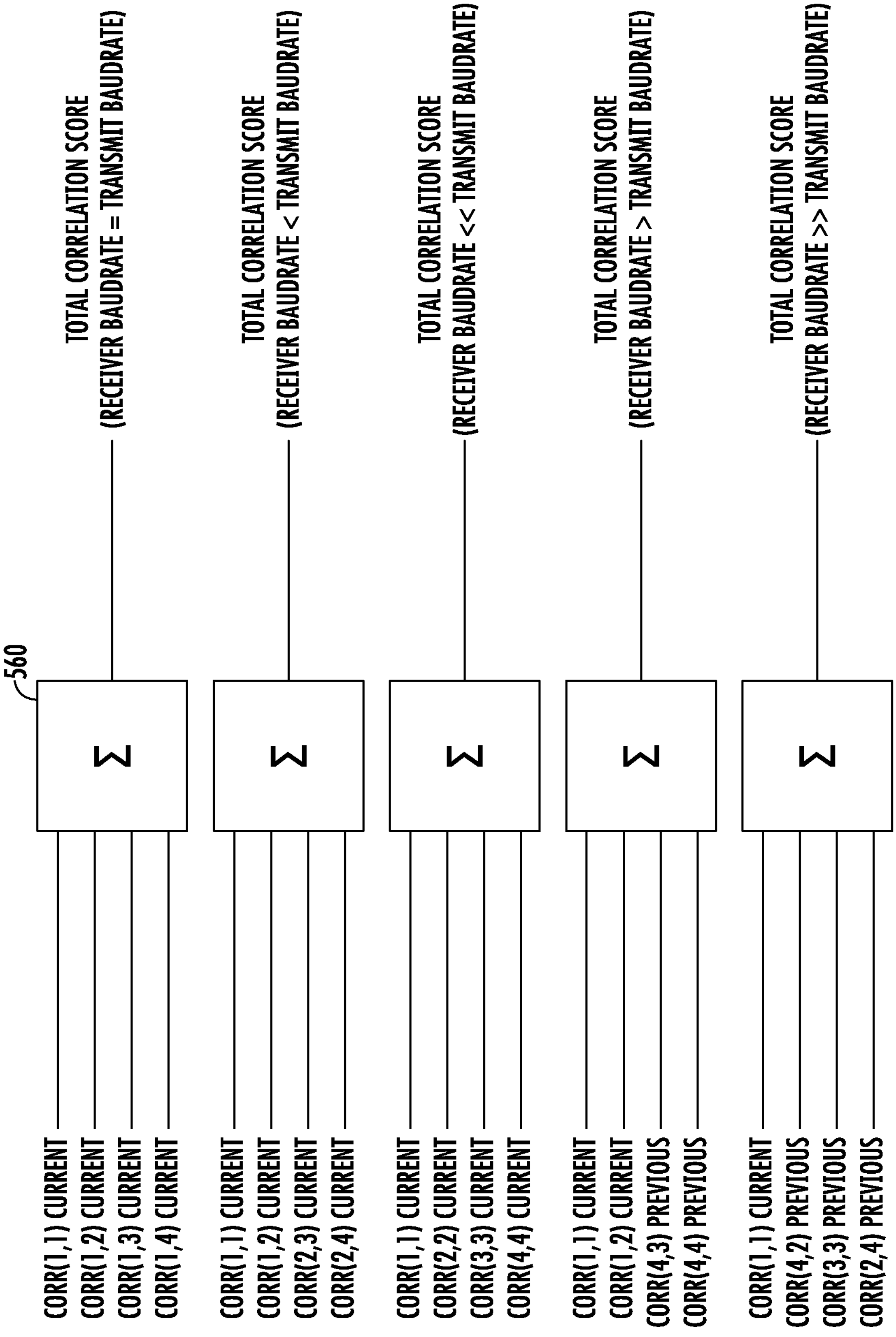
FIG. 17A shows a circuit which uses the outputs from the shift registers to selectively calculate total correlation scores.
Figure 17B:
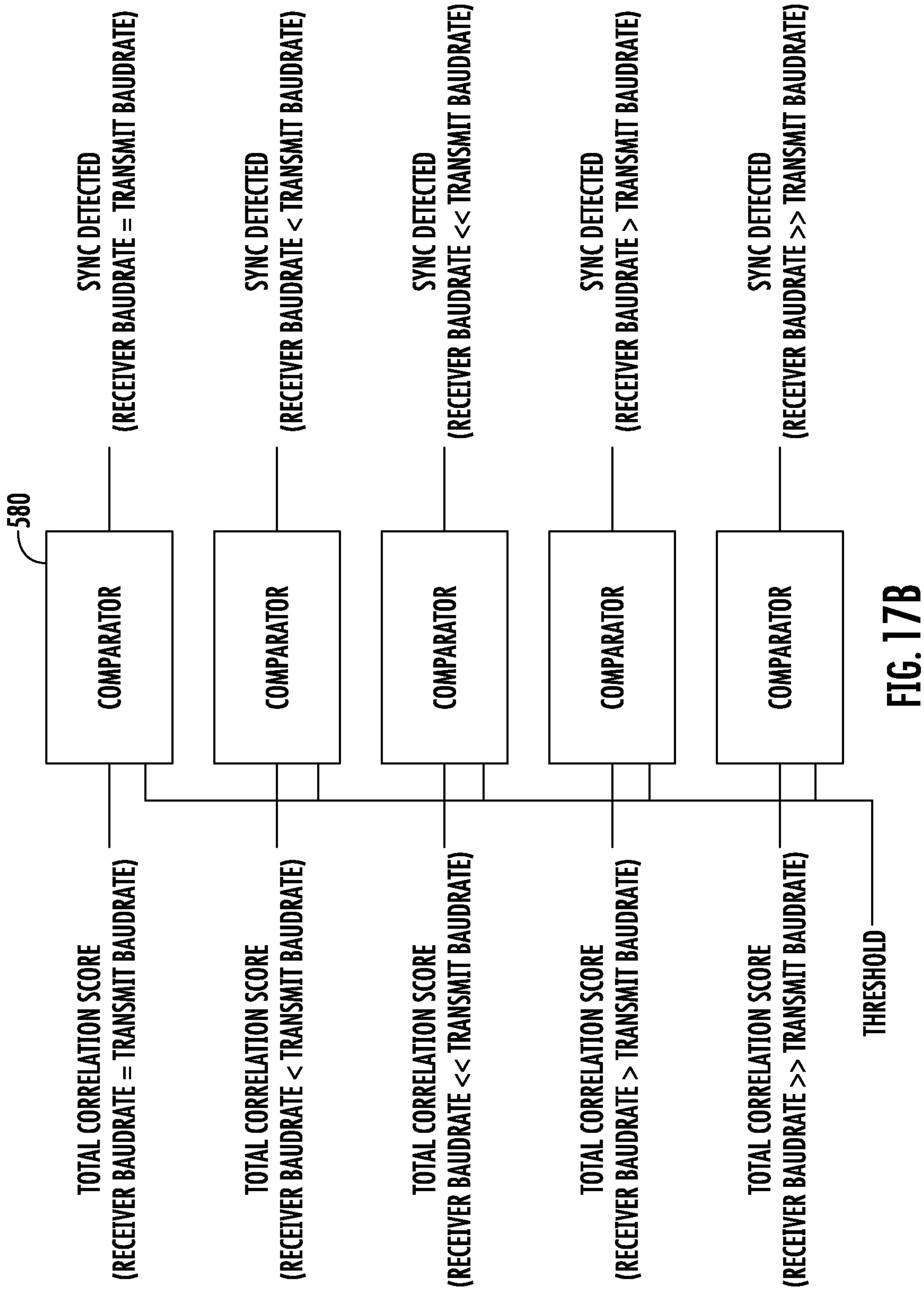
FIG. 17B shows a circuit to detect the synchronization pattern using the outputs from FIG. 17A.

Note that FIG. 17A shows the summing circuits 560 used for the first total correlation score. Similar circuitry is required for the other total correlation scores. Note that while this figure shows total correlation scores based on 5 scenarios, the number of scenarios may be more or less than this. For example, in addition to or alternatively, a scenario where two symbols are added or deleted may be used. Additionally, if, instead of 8 data samples, the correlators 500 each process 4 samples, the shift register 570 may hold more partial correlation scores and the summing circuits 560 in FIG. 17A would include 8 inputs each. Further, as shown in FIG. 17B, the five total correlation scores shown in FIG. 17A are each compared to the predetermined threshold using comparators 580 to determine whether the synchronization pattern is present. If the total correlation score generated by any of the summing circuits 560 is greater than the predetermined threshold, it is assumed that the synchronization pattern has been detected.

As described above with respect to cost function engines, in addition to detecting the synchronization pattern, the Timing Circuit and Frequency Offset Detector 64 may serve other purposes as well. For example, the scenario that generated the greatest correlation score also provides information about the receiver baudrate, relative to the transmit baudrate. For example, if the total correlation score associated with scenario 1 listed above is the lowest, then the two baudrates are operating at very close to the same frequency, and no extra steps need to be taken. If, however, the total correlation score associated with scenario 4 or scenario 7 is the lowest, then there is a large mismatch between these baudrates. As described above, this information from the Timing Circuit and Frequency Offset Detector 64 can be used to implement any of the baudrate offset correction methods described above.

Thus, generally, the synchronization pattern detector comprises an array of pattern detectors. Each pattern detector processes a certain number of samples to generate a metric. In some embodiments, the pattern detector is a cost function engine and the metric is cost, while in other embodiments, the pattern detector is a correlator and the metric is correlation score. These outputs from the pattern detectors may be contained in a shift register that include previous partial metrics, current partial metrics and future partial metrics. A summing circuit is configured to add certain outputs from these shift registers to generate a total metric. The goal of the synchronization pattern detector is to optimize this total metric. For cost function engines, the optimized total metric is the lowest cost, while for correlators, the optimized metric is the greatest correlation score.

Figure 13A:
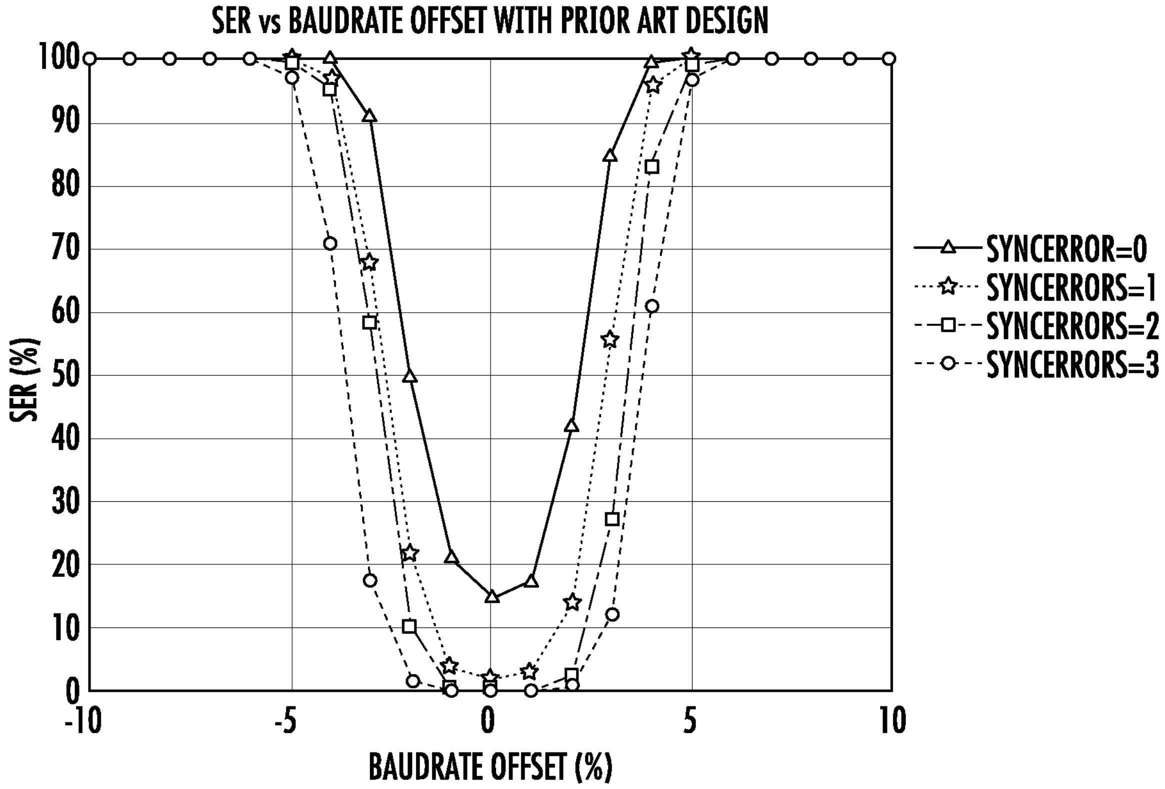
FIGS. 13A-13B show the performance difference between prior art detectors and the present system.

The present system has many advantages. The present system provides much more robust operation when there is a mismatch between the receiver baudrate and the transmit baudrate. FIG. 13A is a graph showing the performance of the present synchronization detector that utilizes cost function engines. The horizontal axis represents the difference as a percentage, between the receiver baudrate and the transmit baudrate. The vertical axis represents the synchronization error rate (SER), which is the percentage of time that the synchronization detector was unable to correctly detect the synchronization pattern. In some scenarios, a SER of 20% is considered to be a reasonable upper limit.

The four lines represent different error tolerances. In some embodiments, the synchronization detector must find an exact match (SYNCERROR=0). This is obviously the most stringent limit and results in a SER greater than 20% when the baudrates differ by only 1.5%. By allowing more errors (SYNCERRORS=1 . . . 3), the SER is improved but the 20% limit is still reached at much less than 5% deviation between the receiver baudrate and the transmit baudrate.

Figure 13B:
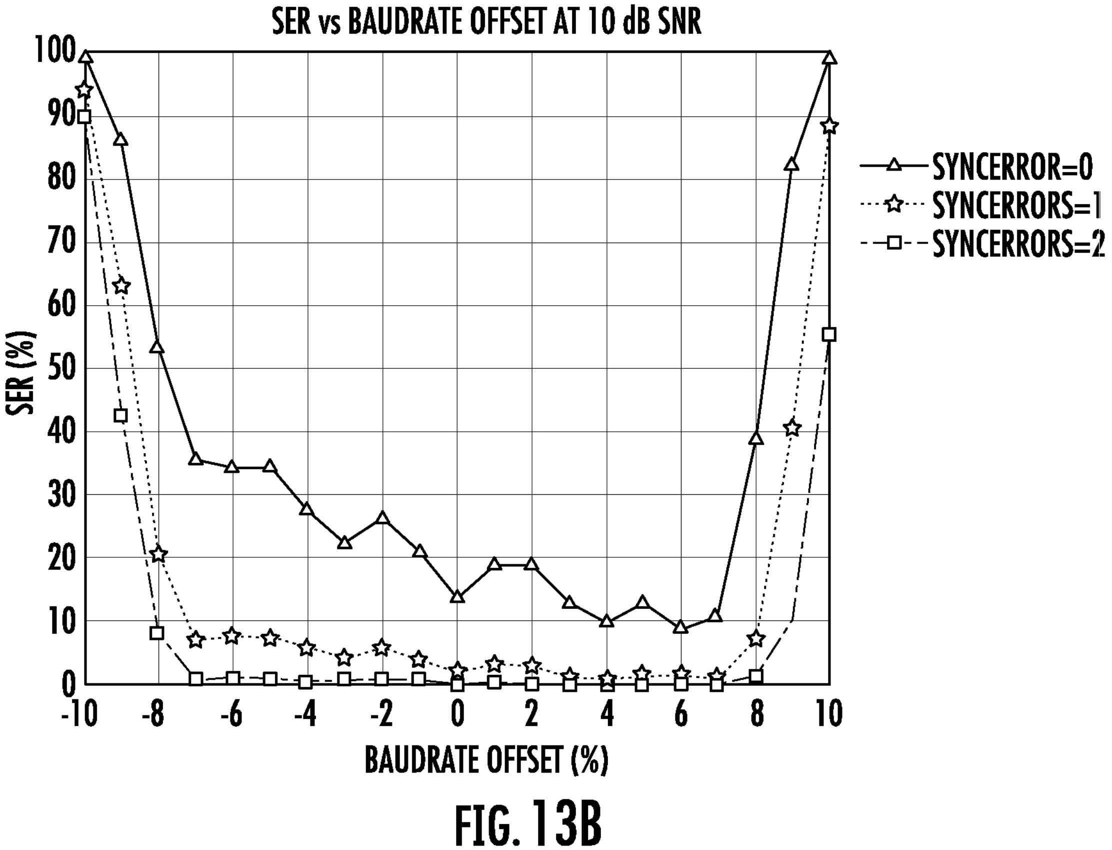

FIG. 13B shows the performance of the disclosed system using a cost function engine. The axis are as described with respect to FIG. 13A. Note that if a single bit error is allowed (SYNCERROR=1), the SER remains below the 20% threshold for baudrate deviations of +/−8%. This represents a large improvement over the prior art and allows synchronization pattern detection over a wider range of receiver baudrate/transmit baudrate combinations.

Note that while the above disclosure describes a synchronization pattern detector that utilizes cost function engines or correlators, other embodiments are also possible.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device, comprising:

a processing unit; and a read circuit, wherein the read circuit comprises:

an RF circuit to receive incoming data and create a plurality of data samples per data bit, each having a certain phase, wherein a number of data samples created per data bit is referred to as an oversample rate (OSR) and wherein data samples that are separated by (OSR−1) samples are referred to as a phase of the data bits and wherein there are OSR phases of the data bits;

a synchronization pattern detector to detect a synchronization pattern from a plurality of received data samples, wherein the synchronization pattern detector comprises:

a plurality of correlators arranged in an array of rows and columns, wherein the rows of the array are associated with a particular phase of the data bits and columns of the array are associated with time; wherein each correlator processes a predetermined number of data samples which all belong to one phase and produces a partial correlation score;

a shift register associated with each correlator to store at least three values, wherein one value is referred to as a current partial correlation score, values that are stored prior to the current partial correlation score are referred to as previous partial correlation scores, and values that are stored after the current partial correlation score are referred to as future partial correlation scores, wherein there is at least one previous partial correlation score, one current partial correlation score and at least one future partial correlation score;

a plurality of summing circuits, each having an input from a shift register associated with a correlator in each column so as to create a total correlation score associated with a symbol stream; and a comparator to compare an output from each summing circuit to a predetermined threshold to determine whether the synchronization pattern has been detected.

2. The wireless network device of claim 1, wherein each correlator processes 8 data samples to generate the partial correlation score.

3. The wireless network device of claim 2, wherein the shift register contains one previous partial correlation score, one current partial correlation score and one future partial correlation score.

4. The wireless network device of claim 1, wherein each correlator processes 4 data samples to generate the partial correlation score.

5. The wireless network device of claim 4, wherein the shift register contains two previous partial correlation scores, one current partial correlation score and two future partial correlation scores.

6. The wireless network device of claim 1, wherein the symbol stream used by at least one of the summing circuits utilizes partial correlation scores generated by correlators using different phases.

7. The wireless network device of claim 1, wherein inputs to at least one summing circuit are selected such that at least one gap larger than (OSR−1) samples or smaller than (OSR−1) samples exists in the symbol stream.

8. The wireless network device of claim 7, wherein, if the total correlation score associated with the at least one summing circuit that utilizes a symbol stream having at least one gap larger than (OSR−1) samples is greatest, the incoming data is transmitted at a transmit baudrate having a lower frequency than a receiver baudrate used by the wireless network device.

9. The wireless network device of claim 8, wherein a number of gaps larger than (OSR−1) samples in the symbol stream that resulted in a greatest correlation score is indicative of a magnitude of a difference between the transmit baudrate and the receiver baudrate used by the wireless network device.

10. The wireless network device of claim 7, wherein, if the total correlation score associated with the at least one summing circuit that utilizes a symbol stream having at least one gap smaller than (OSR−1) samples is greatest, the incoming data is transmitted at a transmit baudrate having a higher frequency than a receiver baudrate used by the wireless network device.

11. The wireless network device of claim 10, wherein a number of gaps smaller than (OSR−1) samples in the symbol stream that resulted in a greatest correlation score is indicative of a magnitude of a difference between the transmit baudrate and the receiver baudrate used by the wireless network device.

12. The wireless network device of claim 7, wherein the read circuit comprises an analog to digital converter to generate data samples, and a sample rate converter to generate I and Q signals at an oversample rate, and a sample memory to store entries used by the synchronization pattern detector and a decision device, wherein parameters associated with the read circuit are modified based on a number of gaps different from (OSR−1) that are present in the symbol stream that resulted in a greatest correlation score.

13. The wireless network device of claim 12, wherein the network device modifies the parameters of the read circuit to eliminate a difference between a receiver baudrate of the wireless network device and the transmit baudrate.

14. The wireless network device of claim 12, wherein the network device modifies the parameters of the read circuit to iteratively reduce a difference between a receiver baudrate of the wireless network device and the transmit baudrate.

15. The wireless network device of claim 12, wherein the network device stores an indication of a difference between a receiver baudrate of the wireless network device and the transmit baudrate for a transmitting node based on a number of gaps different from (OSR−1) that are present in the symbol stream that resulted in a greatest correlation score, and uses the indication to modify the parameters of the read circuit when a subsequent packet is received from the transmitting node.

16. A wireless network device, comprising:

a processing unit; and a read circuit, wherein the read circuit comprises:

an RF circuit to receive incoming data and create a plurality of data samples per data bit, each having a certain phase, wherein a number of data samples created per data bit is referred to as an oversample rate (OSR), the RF circuit comprising an analog to digital converter (ADC) to generate data samples from the incoming data, a sample rate converter to generate I and Q signals at a desired rate, and a sample memory to store a plurality of entries;

a synchronization pattern detector to detect a synchronization pattern using the plurality of entries in the sample memory, wherein the synchronization pattern detector computes a correlation score for each of a plurality of symbol streams, each of the plurality of symbol streams comprising a number of samples equal to a number of bits in the synchronization pattern, wherein in a first set of symbol streams, a gap of (OSR−1) samples exists between each pair of successive samples, wherein in a second set of symbol streams, a gap greater than (OSR−1) samples exists between at least one pair of successive samples, and wherein in a third set of symbol streams, a gap less than (OSR−1) samples exists between at least one pair of successive samples, and wherein the correlation score of each of the plurality of symbol streams is compared to a predetermined threshold, and wherein the synchronization pattern is detected if the correlation score of one of the plurality of symbol streams is greater than the predetermined threshold.

17. The wireless network device of claim 16, wherein a frequency of a sample clock used by the ADC to generate the plurality of data samples is modified based on which of the plurality of symbol streams resulted in detection of the synchronization pattern.

18. The wireless network device of claim 16, wherein a rate at which the I and Q signals are generated by the sample rate converter is adjusted based on which of the plurality of symbol streams resulted in detection of the synchronization pattern.

19. The wireless network device of claim 16, wherein the read circuit comprises a decision device to further process the data samples, wherein entries from the sample memory that are provided to the decision device are selected based on which of the plurality of symbol streams resulted in detection of the synchronization pattern.

* * * * *